(12) United States Patent  (10) Patent No.: US 8,181,104 B1
Helfand et al.  (45) Date of Patent: May 15, 2012

(54) AUTOMATIC CREATION OF CASCADING STYLE SHEETS

(75) Inventors: Russ Helfand, Carpenteria, CA (US); Narciso B. Jaramillo, Oakland, CA (US)

(73) Assignee: Adobe Systems Incorporated, San Jose, CA (US)

( * ) Notice: Subject to any disclaimer, the term of this patent is extended or adjusted under 35 U.S.C. 154(b) by 384 days.

(21) Appl. No.: 10/930,714

(22) Filed: Aug. 31, 2004

(51) Int. Cl.
*G06F 17/30* (2006.01)
*G06F 3/00* (2006.01)

(52) U.S. Cl. ........ 715/234; 715/235; 715/236; 715/243; 715/249

(58) Field of Classification Search .................. 715/517, 715/513, 522, 51, 510, 234, 235, 236, 243, 715/249; 707/1
See application file for complete search history.

(56) References Cited

U.S. PATENT DOCUMENTS

| | | | |
|---|---|---|---|
| 7,051,084 B1 * | 5/2006 | Hayton et al. | 709/219 |
| 7,143,344 B2 * | 11/2006 | Parker et al. | 715/236 |
| 7,178,101 B2 | 2/2007 | Tunning | |
| 2003/0025730 A1 * | 2/2003 | Brennan | 345/760 |
| 2004/0205605 A1 * | 10/2004 | Adler et al. | 715/517 |

OTHER PUBLICATIONS

Oliver Meyer, 'a Tool-Creating Validated XML Documents on the Fly Using MS Word', published: Oct. 23, 2002, pp. 113-121.*

* cited by examiner

*Primary Examiner* — Stephen Hong
*Assistant Examiner* — Wilson Tsui
(74) *Attorney, Agent, or Firm* — Kilpatrick Townsend & Stockton LLP

(57) ABSTRACT

A system and method are described for automatically generating style sheet formatting for stylistic edits to a Web page in a Web development environment. The Web development environment detects the user's selection of particular content of the Web page and captures any stylistic changes that the user makes to the content. Using the stylistic changes, the Web development environment searches a style data structure to determine whether any style rules already exist that correspond to the user's stylistic changes. If the Web development environment does not find a pre-existing style rule, it automatically generates one or more style rules for the stylistic edits and associates those rules with the selected content. If a pre-existing style rule exists within the style data structure, the Web development environment assigns the pre-existing style rule to the selected content.

18 Claims, 25 Drawing Sheets

FIG. 2B-1

```
<?xml version="1.0" encoding="iso-8859-1"?>
<! DOCTYPE html PUBLIC "-//W3C//DTD XHTML 1.0 Transitional//EN" "http://www.w3.org/TR/
xhtml1/DTD/xhtml1-transitional.dtd">
<html xmlns="http://www.w3.org/1999/xhtml">
<head>
<title>Untitled Document</title>
<link rel="stylesheet" href="file:///C |/Program%20Files/Macromedia/Dreamweaver%20MX%
202004/Samples/GettingStarted/1-Design/Assets/CSS/divs.css" type="text/css" />
<meta http-equiv="Content-Type" content="text/html; charset=iso-8859-1" />
</head>
<body>
<div id="row1">
    <h1>Lorem Ipsum Dolor </h1>
</div>
<div id="main">
    <div id="col2">
        <div id="feature">
            <h1>Title </h1>
            <p>Lorem ipsum dolor sit amet, consectetuer adipiscing elit. Donec molestie.
            Sed aliquam sem ut arcu. Phasellus sollicitudin. Vestibulum condimentum
            facilisis nulla. In hac habitasse platea dictumst. Nulla nonummy. Cras
            quis libero. Cras venenatis. Aliquam posuere lobortis pede. Nullam fringilla
            urna id leo. Praesent aliquet pretium erat. Praesent non odio. Pellentesque
            a magna a mauris vulputate lacinia. Aenean viverra. Class aptent taciti
            sociosqu ad litora torquent per conubia nostra, per inceptos hymenaeos.
            Aliquam lacus. Mauris magna eros, semper a, tempor et, rutrum et, tortor.</p>
        </div>
    </div>
    <div id="col1">
        <h2>News</h2>
        <p>Lorem ipsum dolor sit amet, consectetuer adipiscing elit. Donec molestie.
            Sed aliquam sem ut arcu. Phasellus sollicitudin.</p>
    </div>
</div>
</body>
</html>
```

23 — STYLE GENERATOR

A FROM FIG. 2B-1

22

```
<?xml version="1.0" encoding="iso-8859-1"?>
<! DOCTYPE html PUBLIC "-//W3C//DTD XHTML 1.0 Transitional//EN" "http://www.w3.org/TR/xhtml1/DTD/xhtml1-transitional.dtd">
<html xmlns="http://www.w3.org/1999/xhtml">
<head>
<title>Untitled Document</title>
<link rel="stylesheet" href="file:///C|/Program%20Files/Macromedia/Dreamweaver%20MX%202004/Samples/GettingStarted/1-Design/Assets/CSS/divs.css" type="text/css" />
<meta http-equiv="Content-Type" content="text/html; charset=iso-8859-1" />
<style type="text/css">
<!--
.style1 {
    font-family: Batang, "Goudy01St BT", Haettenschweiler;
    font-size: 18px;
    font-weight: bold;
    color: #FF0000;
}
-->
</style>
</head>
<body>
<div id="row1">
   <h1>Lorem Ipsum Dolor </h1>
</div>
<div id="main">
   <div id="col2">
      <div id="feature">
         <h1>Title</h1>
         <p><span class="style1">Lorem ipsum dolor</span> sit amet, consectetuer
adipiscing elit. Donec molestie.
            Sed aliquam sem ut arcu. Phasellus sollicitudin. Vestibulum condimentum
            facilisis nulla. In hac habitasse platea dictumst. Nulla nonummy. Cras
            quis libero. Cras venenatis. Aliquam posuere lobortis pede. Nullam fringilla
            urna id leo. Praesent aliquet pretium erat. Praesent non odio. Pellentesque
            a magna a mauris vulputate lacinia. Aenean viverra. Class aptent taciti
            sociosqu ad litora torquent per conubia nostra, per inceptos hymenaeos.
            Aliquam lacus. Mauris magna eros, semper a, tempor et, rutrum et, tortor.</p>
      </div>
   </div>
   <div id="col1">
      <h2>News</h2>
      <p>Lorem ipsum dolor sit amet, consectetuer adipiscing elit. Donec molestie.
         Sed aliquam sem ut arcu. Phasellus sollicitudin.</p>
   </div>
</div>
</body>
<html>
```

203 — style block

204 — `<h1>Title</h1>`, 200, 204

108 — `<p><span class="style1">Lorem ipsum dolor</span> sit amet, consectetuer...`

102 — paragraph body

```
<?xml version="1.0" encoding="iso-8859-1"?>
<! DOCTYPE html PUBLIC "-//W3C//DTD XHTML 1.0 Transitional//EN" "http://www.w3.org/TR/
xhtml1/DTD/xhtml1-transitional.dtd">
<html xmlns="http://www.w3.org/1999/xhtml">
<head>
<title>Untitled Document</title>
<link rel="stylesheet" href="file:///C|/Program%20Files/Macromedia/Dreamweaver%20MX%
202004/Samples/GettingStarted/1-Design/Assets/CSS/divs.css" type="text/css" />
<meta http-equiv="Content-Type" content="text/html; charset=iso-8859-1" />
<style type="text/css">
<!--
.style1 {
    font-family: Batang, "Goudy01St BT", Haettenschweiler;
    font-size: 18px;
    font-weight: bold;
    color: #FF0000;
}                                              } 203
.style2 {
    font-family: Batang, "Goudy01St BT", Haettenschweiler;
    font-size: 18px;
    font-weight: bold;
    color: #0000FF;
}                                              } 304
-->
</style>
</head>
<body>
<div id="row1">
    <h1>Lorem Ipsum Dolor </h1>
</div>
<div id="main">
    <div id="col2">
        <div id="feature">
            <h1>Title</h1>   204    200    204
            <p><span class="style1">Lorem ipsum dolor</span> sit amet, consectetuer
adipiscing elit. Donec molestie.
                Sed aliquam sem ut arcu. Phasellus sollicitudin. Vestibulum condimentum
                facilisis nulla. In hac habitasse platea dictumst. <span class="style2">
Nulla nonummy.</span> Cras
              300    302                   302                              } 102
                quis libero. Cras venenatis. Aliquam posuere lobortis pede. Nullam fringilla
                urna id leo. Praesent aliquet pretium erat. Pellentesque
                a magna a mauris vulputate lacinia. Aenean viverra. Class aptent taciti
                sociosqu ad litora torquent per conubia nostra, per inceptos hymenaeos.
                Aliquam lacus. Mauris magna eros, semper a, tempor et, rutrum et, tortor.</p>
        </div>  301
    </div>
    <div id="col1">
        <h2>News</h2>
        <p>Lorem ipsum dolor sit amet, consectetuer adipiscing elit. Donec molestie.
            Sed aliquam sem ut arcu. Phasellus sollicitudin.</p>
    </div>
</div>
</body>
<html>
```

23 — STYLE GENERATOR    31

B FROM FIG. 3B-1

32

```
<?xml version="1.0" encoding="iso-8859-1"?>
<! DOCTYPE html PUBLIC "-//W3C//DTD XHTML 1.0 Transitional//EN" "http://www.w3.org/TR/
xhtml1/DTD/xhtml1-transitional.dtd">
<html xmlns="http://www.w3.org/1999/xhtml">
<head>
<title>Untitled Document</title>
<link rel="stylesheet" href="file:///C|/Program%20Files/Macromedia/Dreamweaver%20MX%
202004/Samples/GettingStarted/1-Design/Assets/CSS/divs.css" type="text/css" />
<meta http-equiv="Content-Type" content="text/html; charset=iso-8859-1" />
<style type="text/css">
<!--
.style1 {
    font-family: Batang, "Goudy01St BT", Haettenschweiler;
    font-size: 18px;
    font-weight: bold;
    color: #FF0000;
}                                                              } 203
.style2 {
    font-family: Batang, "Goudy01St BT", Haettenschweiler;
    font-size: 18px;
    font-weight: bold;
    color: #0000FF;
}                                                              } 304
-->
</style>
</head>
<body>
<div id="row1">
    <h1>Lorem Ipsum Dolor </h1>
</div>
<div id="main">
    <div id="col2">
        <div id="feature">
            <h1>Title</h1>   204        200         204
            <p><span class="style1">Lorem ipsum dolor</span> sit amet, consectetuer
adipiscing elit. Donec molestie.
                Sed aliquam sem ut arcu. Phasellus sollicitudin. Vestibulum condimentum
                facilisis nulla. In hac habitasse platea dictumst. <span class="style2">
Nulla nonummy.</span> Cras
            300    302                                                302
                quis libero. Cras venenatis. Aliquam posuere lobortis pede. Nullam fringilla
                urna id leo. Praesent aliquet pretium erat. Praesent non odio. Pellentesque
                a magna a mauris vulputate lacinia. Aenean viverra. Class aptent taciti
                sociosqu ad litora torquent per conubia nostra, per inceptos hymenaeos.
                <span class="style1">Aliquam lacus</span>. Mauris magna eros, semper a,
                     303              301        303
tempor et, rutrum et, tortor.</p>
        </div>
    </div>
    <div id="col1">
        <h2>News</h2>
        <p>Lorem ipsum dolor sit amet, consectetuer adipiscing elit. Donec molestie.
            Sed aliquam sem ut arcu. Phasellus sollicitudin.</p>
    </div>
</div>
</body>
<html>
```

```
<?xml version="1.0" encoding="iso-8859-1"?>
<! DOCTYPE html PUBLIC "-//W3C//DTD XHTML 1.0 Transitional//EN" "http://www.w3.org/TR/
xhtml1/DTD/xhtml1-transitional.dtd">
<html xmlns="http://www.w3.org/1999/xhtml">
<head>
<title>Untitled Document</title>
<link rel="stylesheet" href="file:///C|/Program%20Files/Macromedia/Dreamweaver%20MX%
202004/Samples/GettingStarted/1-Design/Assets/CSS/divs.css" type="text/css" />
<meta http-equiv="Content-Type" content="text/html; charset=iso-8859-1" />
</head>
<body>
<div id="row1">
    <h1>Lorem Ipsum Dolor </h1>
</div>
<div id="main">
    <div id="col2">
        <div id="feature">
            <h1>Title </h1>
            <p>Lorem ipsum dolor sit amet, consectetuer adipiscing elit. Donec molestie.
            Sed aliquam sem ut arcu. Phasellus sollicitudin. Vestibulum condimentum
            facilisis nulla. In hac habitasse platea dictumst. Nulla nonummy. Cras
            quis libero. Cras venenatis. Aliquam posuere lobortis pede. Nullam fringilla
            urna id leo. Praesent aliquet pretium erat. Praesent non odio. Pellentesque
            a magna a mauris vulputate lacinia. Aenean viverra. Class aptent taciti
            sociosqu ad litora torquent per conubia nostra, per inceptos hymenaeos.
            Aliquam lacus. Mauris magna eros, semper a, tempor et, rutrum et, tortor.</p>
        </div>
    </div>
    <div id="col1">
        <h2>News</h2>
        <p>Lorem ipsum dolor sit amet, consectetuer adipiscing elit. Donec molestie.
            Sed aliquam sem ut arcu. Phasellus sollicitudin.</p>
    </div>
</div>
</body>
</html>
```

C FROM FIG. 4B-1

41

```
<?xml version="1.0" encoding="iso-8859-1"?>
<! DOCTYPE html PUBLIC "-//W3C//DTD XHTML 1.0 Transitional//EN" "http://www.w3.org/TR/
xhtml1/DTD/xhtml1-transitional.dtd">
<html xmlns="http://www.w3.org/1999/xhtml">
<head>
<title>Untitled Document</title>
<link rel="stylesheet" href="file:///C|/Program%20Files/Macromedia/Dreamweaver%20MX%
202004/Samples/GettingStarted/1-Design/Assets/CSS/divs.css" type="text/css" />
<meta http-equiv="Content-Type" content="text/html; charset=iso-8859-1" />

<style type="text/css">
<!--
.style3 {
    font-family: "Century Gothic";
    font-size: 14px;
    color: #00FF00;
}
-->
</style>
</head>
<body>
<div id="row1">
    <h1>Lorem Ipsum Dolor </h1>
</div>
<div id="main">
    <div id="col2">
        <div id="feature">
            <h1>Title</h1>
```
401

108 — `<p class="style3">`Lorem ipsum dolor sit amet, consectetuer adipiscing elit.
Donec molestie.
     Sed aliquam sem ut arcu. Phasellus sollicitudin. Vestibulum condimentum
     facilisis nulla. In hac habitasse platea dictumst. Nulla nonummy. Cras
     quis libero. Cras venenatis. Aliquam posuere lobortis pede. Nullam fringilla
     urna id leo. Praesent aliquet pretium erat. Praesent non odio. Pellentesque
     a magna a mauris vulputate lacinia. Aenean viverra. Class aptent taciti
     sociosqu ad litora torquent per conubia nostra, per inceptos hymenaeos.
     Aliquam lacus. Mauris magna eros, semper a, tempor et, rutrum et, tortor.`</p>`
            `</div>`
        `</div>`
        `<div id="col1">`
            `<h2>`News`</h2>`
            `<p>`Lorem ipsum dolor sit amet, consectetuer adipiscing elit. Donec molestie.
                Sed aliquam sem ut arcu. Phasellus sollicitudin.`</p>`
        `</div>`
    `</div>`
`</body>`
`<html>`

402 (style block)
102 (paragraph block)
108

```
<?xml version="1.0" encoding="iso-8859-1"?>
<! DOCTYPE html PUBLIC "-//W3C//DTD XHTML 1.0 Transitional//EN" "http://www.w3.org/TR/
xhtml1/DTD/xhtml1-transitional.dtd">
<html xmlns="http://www.w3.org/1999/xhtml">
<head>
<title>Untitled Document</title>
<link rel="stylesheet" href="file:///C |/Program%20Files/Macromedia/Dreamweaver%20MX%
202004/Samples/GettingStarted/1-Design/Assets/CSS/divs.css" type="text/css" />
<meta http-equiv="Content-Type" content="text/html; charset=iso-8859-1" />

</head>
<body>
<div id="row1">
    <h1>Lorem Ipsum Dolor </h1>
</div>
<div id="main">
    <div id="col2">
        <div id="feature">
            <h1>Title</h1>
108 ~    ~ 501
            <p><i>Lorem ipsum dolor sit amet, consectetuer adipiscing elit.
Donec molestie.
            Sed aliquam sem ut arcu. Phasellus sollicitudin. Vestibulum condimentum
            facilisis nulla. In hac habitasse platea dictumst. Nulla nonummy. Cras
            quis libero. Cras venenatis. Aliquam posuere lobortis pede. Nullam fringilla
            urna id leo. Praesent aliquet pretium erat. Praesent non odio. Pellentesque
            a magna a mauris vulputate lacinia. Aenean viverra. Class aptent taciti
            sociosqu ad litora torquent per conubia nostra, per inceptos hymenaeos.
            Aliquam lacus. Mauris magna eros, semper a, tempor et, rutrum et, tortor.<i></p>
        </div>
    </div>                                                                  501   108
    <div id="col1">
        <h2>News</h2>
        <p>Lorem ipsum dolor sit amet, consectetuer adipiscing elit. Donec molestie.
            Sed aliquam sem ut arcu. Phasellus sollicitudin.</p>
    </div>
</div>
</body>
</html>
```

53 — STYLE GENERATOR

TO FIG. 5B-2

*FIG. 5B-2*   FROM FIG. 5B-1   52

```
<?xml version="1.0" encoding="iso-8859-1"?>
<! DOCTYPE html PUBLIC "-//W3C//DTD XHTML 1.0 Transitional//EN" "http://www.w3.org/TR/
xhtml1/DTD/xhtml1-transitional.dtd">
<html xmlns="http://www.w3.org/1999/xhtml">
<head>
<title>Untitled Document</title>
<link rel="stylesheet" href="file:///C|/Program%20Files/Macromedia/Dreamweaver%20MX%
202004/Samples/GettingStarted/1-Design/Assets/CSS/divs.css" type="text/css" />
<meta http-equiv="Content-Type" content="text/html; charset=iso-8859-1" />

<style type="text/css">
<!--
.style2 {
    font-family: Geneva, Arial, Helvetica, sans-serif;     ⎫
    font-weight: bold;                                      ⎬ 505
    color: #FF0000;                                         ⎭
}
-->
</style>
</head>
<body>
<div id="row1">
    <h1>Lorem Ipsum Dolor </h1>
</div>
<div id="main">
    <div id="col2">
        <div id="feature">
            <h1>Title</h1>
                           501
108  <p><i>Lorem ipsum dolor sit amet, consectetuer adipiscing elit. Donec
molestie.       503            502
504     Sed aliquam sem ut arcu. </i> <span class="style2">Phasellus sollicitudin.
</span><i> Vestibulum condimentum
                 facilisis nulla. In hac habitasse platea dictumst. Nulla nonummy. Cras   500
       502       quis libero. Cras venenatis. Aliquam posuere lobortis pede. Nullam fringilla
                 urna id leo. Praesent aliquet pretium erat. Praesent non odio. Pellentesque
                 a magna a mauris vulputate lacinia. Aenean viverra. Class aptent taciti
       108       sociosqu ad litora torquent per conubia nostra, per inceptos hymenaeos.
                 Aliquam lacus. Mauris magna eros, semper a, tempor et, rutrum et, tortor.</i>
</p>                                                                              501
        </div>
    </div>
    <div id="col1">
        <h2>News</h2>
        <p>Lorem ipsum dolor sit amet, consectetuer adipiscing elit. Donec molestie.
            Sed aliquam sem ut arcu. Phasellus sollicitudin.</p>
    </div>
</div>
</body>
<html>
```

```
<?xml version="1.0" encoding="iso-8859-1"?>
<! DOCTYPE html PUBLIC "-//W3C//DTD XHTML 1.0 Transitional//EN" "http://www.w3.org/TR/
xhtml1/DTD/xhtml1-transitional.dtd">
<html xmlns="http://www.w3.org/1999/xhtml">
<head>
<title>Untitled Document</title>
<link rel="stylesheet" href="file:///C|/Program%20Files/Macromedia/Dreamweaver%20MX%
202004/Samples/GettingStarted/1-Design/Assets/CSS/divs.css" type="text/css" />
<meta http-equiv="Content-Type" content="text/html; charset=iso-8859-1" />

</head>
<body>
<div id="row1">
   <h1>Lorem Ipsum Dolor </h1>
</div>
<div id="main">
   <div id="col2">
      <div id="feature">
         <h1>Title</h1>
         <p><i>Lorem ipsum dolor sit amet, consectetuer adipiscing elit.
Donec molestie.
         Sed aliquam sem ut arcu. Phasellus sollicitudin. Vestibulum condimentum
         facilisis nulla. In hac habitasse platea dictumst. Nulla nonummy. Cras
         quis libero. Cras venenatis. Aliquam posuere lobortis pede. Nullam fringilla
         urna id leo. Praesent aliquet pretium erat. Praesent non odio. Pellentesque
         a magna a mauris vulputate lacinia. Aenean viverra. Class aptent taciti
         sociosqu ad litora torquent per conubia nostra, per inceptos hymenaeos.
         Aliquam lacus. Mauris magna eros, semper a, tempor et, rutrum et, tortor.<i></p>
      </div>
   </div>
   <div id="col1">
      <h2>News</h2>
         <p>Lorem ipsum dolor sit amet, consectetuer adipiscing elit. Donec molestie.
         Sed aliquam sem ut arcu. Phasellus sollicitudin.</p>
   </div>
</div>
</body>
</html>
```

51

108 ~ 501 ... 501 108

53 — STYLE GENERATOR

FROM FIG. 6B-1 (E)

61

```
<?xml version="1.0" encoding="iso-8859-1"?>
<!DOCTYPE html PUBLIC "-//W3C//DTD XHTML 1.0 Transitional//EN" "http://www.w3.org/TR/
xhtml1/DTD/xhtml1-transitional.dtd">
<html xmlns="http://www.w3.org/1999/xhtml">
<head>
<title>Untitled Document</title>
<link rel="stylesheet" href="file:///C|/Program%20Files/Macromedia/Dreamweaver%20MX%
202004/Samples/GettingStarted/1-Design/Assets/CSS/divs.css" type="text/css" />
<meta http-equiv="Content-Type" content="text/html; charset=iso-8859-1" />

<style type="text/css">
<!--
.style2 {
    font-family: Batang, "Goudy01St BT", Haettenschweiler;    ⎫ 602
    font-style: italic; ⟵ 603                                 ⎭
}
-->
</style>
</head>
<body>
<div id="row1">
  <h1>Lorem Ipsum Dolor </h1>
</div>
<div id="main">
  <div id="col2">
    <div id="feature">
      <h1>Title </h1>
108 ⟵<p class="style2">Lorem ipsum dolor sit amet, consectetuer adipiscing elit.
Donec molestie.    601
        Sed aliquam sem ut arcu. Phasellus sollicitudin. Vestibulum condimentum
        facilisis nulla. In hac habitasse platea dictumst. Nulla nonummy. Cras
        quis libero. Cras venenatis. Aliquam posuere lobortis pede. Nullam fringilla   ⎫ 102
        urna id leo. Praesent aliquet pretium erat. Praesent non odio. Pellentesque    ⎬
        a magna a mauris vulputate lacinia. Aenean viverra. Class aptent taciti        ⎪
        sociosqu ad litora torquent per conubia nostra, per inceptos hymenaeos.        ⎭
        Aliquam lacus. Mauris magna eros, semper a, tempor et, rutrum et, tortor.</p>
    </div>
  </div>                                                                          108
  <div id="col1">
    <h2>News</h2>
    <p>Lorem ipsum dolor sit amet, consectetuer adipiscing elit. Donec molestie.
        Sed aliquam sem ut arcu. Phasellus sollicitudin.</p>
  </div>
</div>
</body>
<html>
```

*FIG. 7B-1*

```
<?xml version="1.0" encoding="iso-8859-1"?>
<! DOCTYPE html PUBLIC "-//W3C//DTD XHTML 1.0 Transitional//EN" "http://www.w3.org/TR/
xhtml1/DTD/xhtml1-transitional.dtd">
<html xmlns="http://www.w3.org/1999/xhtml">
<head>
<title>Untitled Document</title>
<link rel="stylesheet" href="file:///C|/Program%20Files/Macromedia/Dreamweaver%20MX%
202004/Samples/GettingStarted/1-Design/Assets/CSS/divs.css" type="text/css" />
<meta http-equiv="Content-Type" content="text/html; charset=iso-8859-1" />

<style type="text/css">
<!--
.style2 {
    color: #0000FF;            }  701
    font-style: italic;        }

} -->
</style>
</head>
<body>
<div id="row1">
    <h1>Lorem Ipsum Dolor </h1>
</div>
<div id="main">
    <div id="col2">
        <div id="feature">
            <h1>Title </h1>
108  <p class="style2">Lorem ipsum dolor sit amet, consectetuer adipiscing elit. Donec
molestie.      ‾‾‾‾‾‾‾‾
                702
            Sed aliquam sem ut arcu. Phasellus sollicitudin. Vestibulum condimentum
            facilisis nulla. In hac habitasse platea dictumst. Nulla nonummy. Cras
            quis libero. Cras venenatis. Aliquam posuere lobortis pede. Nullam fringilla
            urna id leo. Praesent aliquet pretium erat. Praesent non odio. Pellentesque
            a magna a mauris vulputate lacinia. Aenean viverra. Class aptent taciti
            sociosqu ad litora torquent per conubia nostra, per inceptos hymenaeos.
            Aliquam lacus. Mauris magna eros, semper a, tempor et, rutrum et, tortor.</p>
        </div>
    </div>                                                                      ↘
    <div id="col1">                                                             108
        <h2>News</h2>
        <p>Lorem ipsum dolor sit amet, consectetuer adipiscing elit. Donec molestie.
            Sed aliquam sem ut arcu. Phasellus sollicitudin.</p>
    </div>
</div>
</body>
<html>
```

53 — STYLE GENERATOR   70

TO FIG. 7B-2

*FIG. 7B-2*   FROM FIG. 7B-1   71

```
<?xml version="1.0" encoding="iso-8859-1"?>
<! DOCTYPE html PUBLIC "-//W3C//DTD XHTML 1.0 Transitional//EN" "http://www.w3.org/TR/
xhtml1/DTD/xhtml1-transitional.dtd">
<html xmlns="http://www.w3.org/1999/xhtml">
<head>
<title>Untitled Document</title>
<link rel="stylesheet" href="file:///C|/Program%20Files/Macromedia/Dreamweaver%20MX%
202004/Samples/GettingStarted/1-Design/Assets/CSS/divs.css" type="text/css" />
<meta http-equiv="Content-Type" content="text/html; charset=iso-8859-1" />

<style type="text/css">
<!--                    703
.style2 {
    font-family: Geneva, Arial, Helvetica, sans-serif;  ⎫
    color: #0000FF;                                     ⎬ 701
    font-style: italic;                                 ⎭
}
-->
</style>
</head>
<body>
<div id="row1">
    <h1>Lorem Ipsum Dolor </h1>
</div>
<div id="main">
    <div id="col2">
        <div id="feature">
            <h1>Title </h1>
108 ⟶ <p class="style2">Lorem ipsum dolor sit amet, consectetuer adipiscing elit. Donec
molestie.
                         702
            Sed aliquam sem ut arcu. Phasellus sollicitudin. Vestibulum condimentum
            facilisis nulla. In hac habitasse platea dictumst. Nulla nonummy. Cras
            quis libero. Cras venenatis. Aliquam posuere lobortis pede. Nullam fringilla
            urna id leo. Praesent aliquet pretium erat. Praesent non odio. Pellentesque
            a magna a mauris vulputate lacinia. Aenean viverra. Class aptent taciti
            sociosqu ad litora torquent per conubia nostra, per inceptos hymenaeos.
            Aliquam lacus. Mauris magna eros, semper a, tempor et, rutrum et, tortor.</p>
        </div>
    </div>                                                                      108
    <div id="col1">
        <h2>News</h2>
        <p>Lorem ipsum dolor sit amet, consectetuer adipiscing elit. Donec molestie.
            Sed aliquam sem ut arcu. Phasellus sollicitudin.</p>
    </div>
</div>
</body>
<html>
```

*FIG. 8B-1*

```
<?xml version="1.0" encoding="iso-8859-1"?>
<!DOCTYPE html PUBLIC "-//W3C//DTD XHTML 1.0 Transitional//EN" "http://www.w3.org/TR/
xhtml1/DTD/xhtml1-transitional.dtd">
<html xmlns="http://www.w3.org/1999/xhtml">
<head>
<title>Untitled Document</title>
<link rel="stylesheet" href="file:///C|/Program%20Files/Macromedia/Dreamweaver%20MX%
202004/Samples/GettingStarted/1-Design/Assets/CSS/divs.css" type="text/css" />
<meta http-equiv="Content-Type" content="text/html; charset=iso-8859-1" />

<style type="text/css">
<!--
.BlueGeneva {       ⟵ 82
    font-family: Geneva, Arial, Helvetica, sans-serif;   ⎫
    color: #0000FF;                                      ⎬ 801
}                                                        ⎭

-->
</style>
</head>
<body>
<div id="row1">
    <h1>Lorem Ipsum Dolor </h1>
</div>
<div id="main">
    <div id="col2">
        <div id="feature">
            <h1>Title </h1>
108⟶ <p class="BlueGeneva">Lorem ipsum dolor sit amet, consectetuer adipiscing elit.
Donec molestie.      802
            Sed aliquam sem ut arcu. Phasellus sollicitudin. Vestibulum condimentum
            facilisis nulla. In hac habitasse platea dictumst. Nulla nonummy. Cras
            quis libero. Cras venenatis. Aliquam posuere lobortis pede. Nullam fringilla
            urna id leo. Praesent aliquet pretium erat. Praesent non odio. Pellentesque
            a magna a mauris vulputate lacinia. Aenean viverra. Class aptent taciti
            sociosqu ad litora torquent per conubia nostra, per inceptos hymenaeos.
            Aliquam lacus. Mauris magna eros, semper a, tempor et, rutrum et, tortor.</p>
        </div>
    </div>                                                                      108
    <div id="col1">
        <h2>News</h2>
        <p>Lorem ipsum dolor sit amet, consectetuer adipiscing elit. Donec molestie.
            Sed aliquam sem ut arcu. Phasellus sollicitudin.</p>
    </div>
</div>
</body>
<html>
```

53 — STYLE GENERATOR      80

FROM FIG. 8B-1 (G)

81

```
<?xml version="1.0" encoding="iso-8859-1"?>
<! DOCTYPE html PUBLIC "-//W3C//DTD XHTML 1.0 Transitional//EN" "http://www.w3.org/TR/
xhtml1/DTD/xhtml1-transitional.dtd">
<html xmlns="http://www.w3.org/1999/xhtml">
<head>
<title>Untitled Document</title>
<link rel="stylesheet" href="file:///C|/Program%20Files/Macromedia/Dreamweaver%20MX%
202004/Samples/GettingStarted/1-Design/Assets/CSS/divs.css" type="text/css" />
<meta http-equiv="Content-Type" content="text/html; charset=iso-8859-1" />

<style type="text/css">
<!--
.BlueGeneva {          ⟵ 82
    font-family: Geneva, Arial, Helvetica, sans-serif;    ⎫
    color: #0000FF;                                        ⎬ 801
}                                                          ⎭
.style2 {font-family: Geneva, Arial, Helvetica, sans-serif; color: #0000FF; font-style: italic; }   ⟵ 803
-->
</style>          804                        805
</head>
<body>
<div id="row1">
    <h1>Lorem Ipsum Dolor </h1>
</div>
<div id="main">
    <div id="col2">
        <div id="feature">
            <h1>Title </h1>
108 ⟶ <p class="style2">Lorem ipsum dolor sit amet, consectetuer adipiscing elit. Donec
molestie.         802
            Sed aliquam sem ut arcu. Phasellus sollicitudin. Vestibulum condimentum
            facilisis nulla. In hac habitasse platea dictumst. Nulla nonummy. Cras
            quis libero. Cras venenatis. Aliquam posuere lobortis pede. Nullam fringilla
            urna id leo. Praesent aliquet pretium erat. Praesent non odio. Pellentesque
            a magna a mauris vulputate lacinia. Aenean viverra. Class aptent taciti
            sociosqu ad litora torquent per conubia nostra, per inceptos hymenaeos.
            Aliquam lacus. Mauris magna eros, semper a, tempor et, rutrum et, tortor.</p>
        </div>
    </div>                                                                      ⟶ 108
    <div id="col1">
        <h2>News</h2>
        <p>Lorem ipsum dolor sit amet, consectetuer adipiscing elit. Donec molestie.
            Sed aliquam sem ut arcu. Phasellus sollicitudin.</p>
    </div>
</div>
</body>
<html>
```

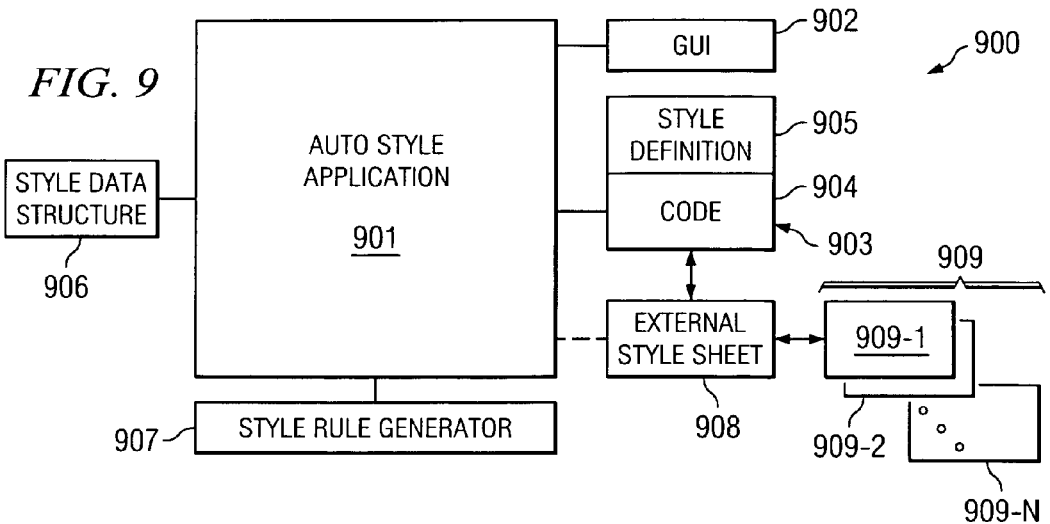
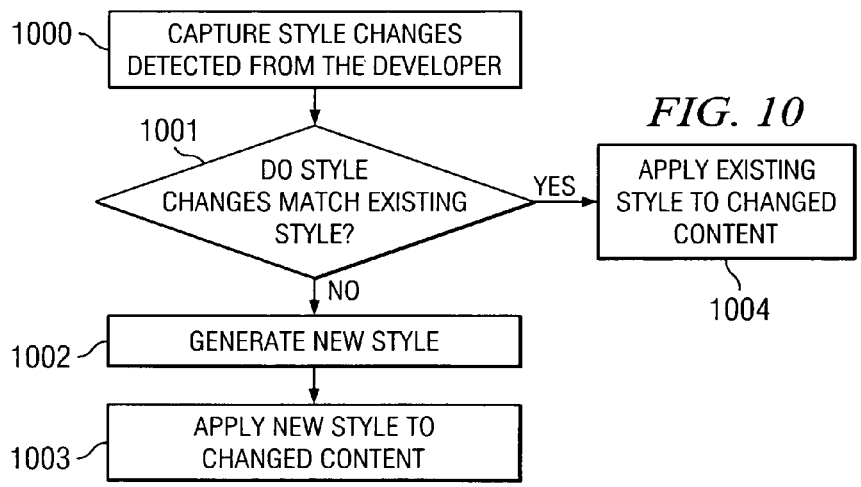
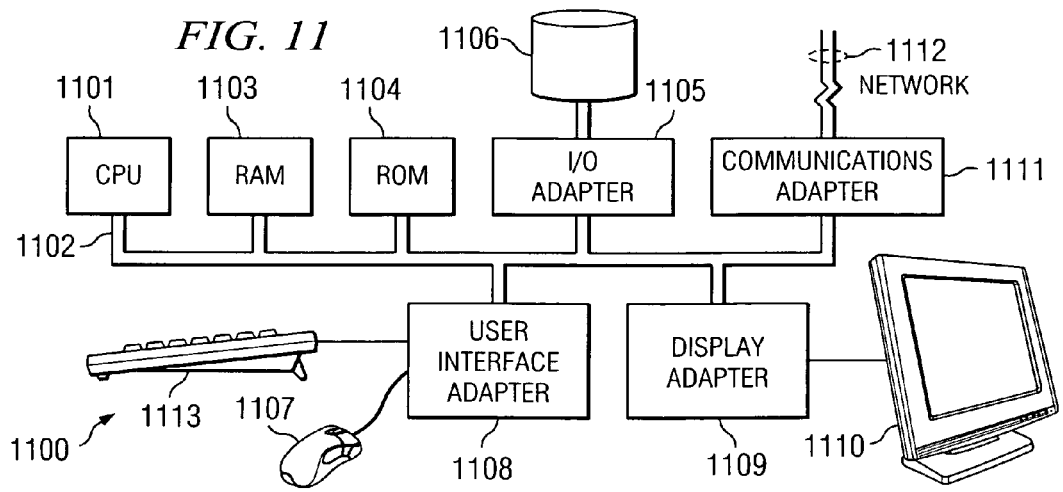

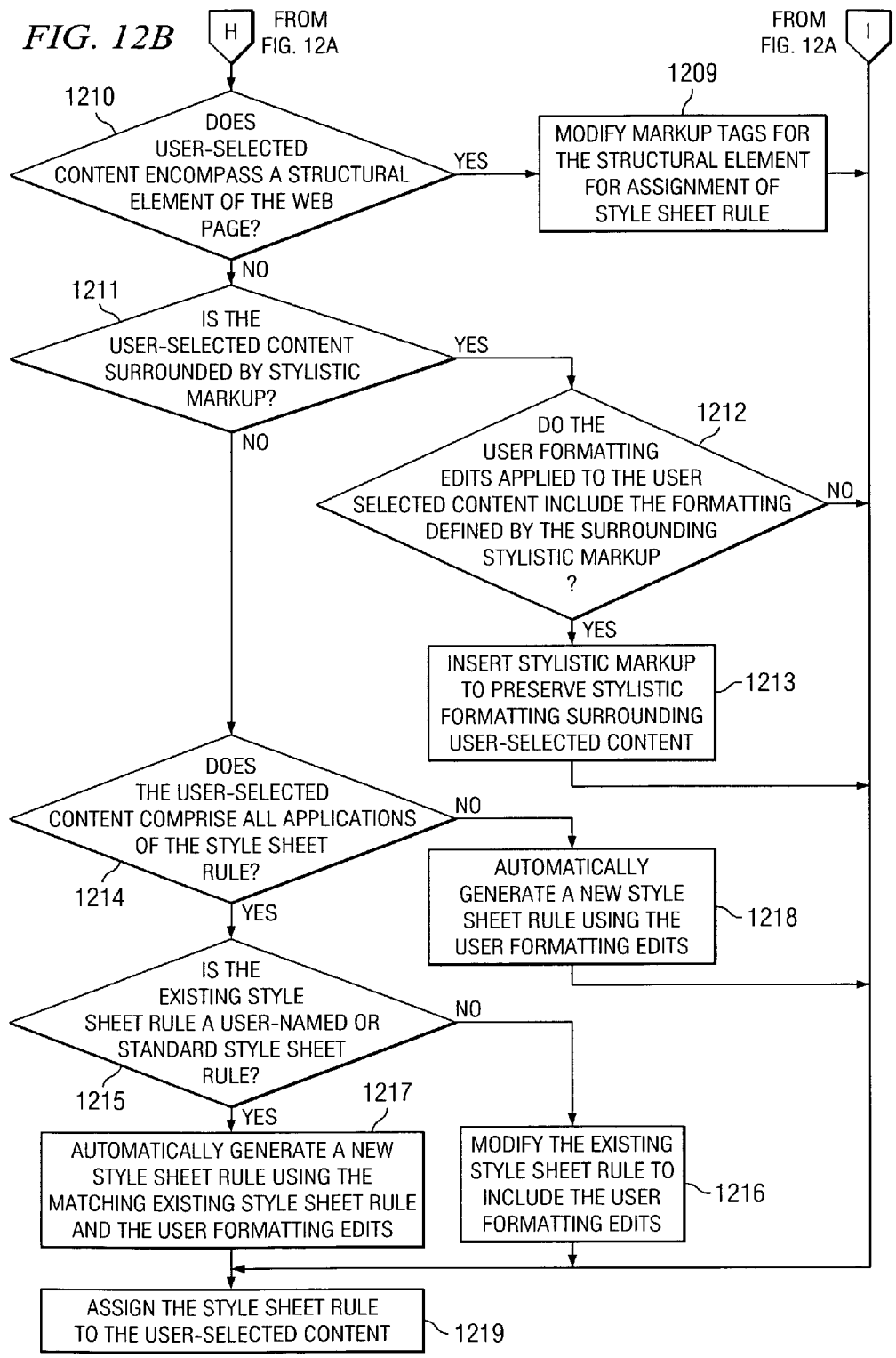

AUTOMATIC CREATION OF CASCADING STYLE SHEETS

TECHNICAL FIELD

The present invention relates, in general, to Web development environments and, more specifically, to automatic creation of cascading style sheets.

BACKGROUND OF THE INVENTION

Hypertext markup language (HTML) is a markup language typically used to define the style, appearance, and/or structure of a document displayed in a Web browser. HTML and its successor languages, such as Extensible HTML (XHTML) have been generally used to define the style, appearance, and/or structure of Web pages from the very early stages of the World Wide Web (Web). Initially, markup tags that defined the structure, such as those defining headings, paragraphs, lists, tables, and the like (i.e., structural markup), were included along side markup tags that defined the style and appearance of the page content, such as bold, underlined, font, font size, and the like (i.e., stylistic markup). The addition of more and more stylistic markup generally made Web pages and Web sites look more and more interesting. However, with all of these stylistic markup, even the most basic Web pages typically became longer and more complicated. Therefore, creating and editing Web pages usually became more and more difficult.

Cascading Style Sheets (CSS) is a style sheet format language that was developed, in general, to control the styling of a Web document. Using CSS, developers are typically able to separate the style of a Web document from its structure and content. Thus, developers are generally able to define the style of an entire Web document by defining styles and applying those styles to the content and structure of the document. Because the style is applied to the content, one style may be applied to multiple sections of the document, reducing the size of the resulting Web page. Moreover, developers may change the entire appearance of a Web page by changing the CSS without effecting the content of the page.

CSS uses rules to define how a document should appear. These rules may be included within the same Web document, whether in a single location (such as the HTML <head> element) or inline with the element to be changed or in a separate, linked style document. A style may also be defined by name and then, subsequently, be applied to a particular element using a spanning tag around that element that calls and/or identifies the named style. A CSS rule typically includes a selector portion that defines to which elements or classes a rule will be applied, and a declaration that indicates the particular properties of an element that is to be changed, such as its typeface, font, color, and the like, and a value for the change to the particular property. One of the powerful features of CSS is that many of the properties that have been applied to a particular element may be inherited by child elements. If a more specific rule is placed within the document, the more specific rule will usually override any of the properties associated with the general rule. Therefore, the rules may cascade through the document.

CSS is a complicated set of rules that, while becoming a best-practices standard for controlling the style of Web documents, is typically used only by experienced Web developers because of its complexity. Web development environments have been developed that assist in the creation of CSS for Web pages. Such development environments, such as MICROSOFT CORPORATION's FRONTPAGE™, ADOBE SYSTEMS INC.'s GO LIVE™, and the like, each have included CSS editing tools that provide user-selectable CSS rules and styles to apply to the various elements and classes of the Web page being edited. CSS editors, in such development environments, allow developers to create styles that may be saved and easily applied to content within the Web page. While editing the content, some such development environments may present pull-down menus of the available styles to apply and may even provide a preview of how such an applied style will appear in the document. CSS editors also provide text-entry points to allow direct CSS coding by experienced Web developers. These CSS editors allow easier access to CSS coding. However, the Web developer typically is aware of any existing CSS tools and has some knowledge of CSS and how to apply it.

BRIEF SUMMARY OF THE INVENTION

The present invention is directed to a system and method for automatically generating style sheet formatting for stylistic edits to a Web page in a Web development environment. The Web development environment detects the user's selection of particular content of the Web page and captures any stylistic changes that the user makes to the content. Using the stylistic changes, the Web development environment searches a style data structure to determine whether any style rules already exist that correspond to the user's stylistic changes. If the Web development environment does not find a pre-existing style rule, it automatically generates one or more style rules for the stylistic edits and associates those rules with the selected content. If a pre-existing style rule does exist within the style data structure, the Web development environment may then assign the pre-existing style rule to the selected content.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated that the conception and specific embodiment disclosed may be readily utilized as a basis for modifying or designing other structures for carrying out the same purposes of the present invention. It should also be realized that such equivalent constructions do not depart from the invention as set forth in the appended claims. The novel features which are believed to be characteristic of the invention, both as to its organization and method of operation, together with further objects and advantages will be better understood from the following description when considered in connection with the accompanying figures. It is to be expressly understood, however, that each of the figures is provided for the purpose of illustration and description only and is not intended as a definition of the limits of the present invention.

BRIEF DESCRIPTION OF THE DRAWINGS

For a more complete understanding of the present invention, reference is now made to the following descriptions taken in conjunction with the accompanying drawing, in which:

FIGS. 2B-1 and 2B-2 represent a combined block diagram illustrating a style generator, as part of the Web development environment, configured according to one embodiment of the present invention, automatically editing a code listing;

FIGS. 3B-1 and 3B-2 represent a combined block diagram illustrating the style generator, as part of the Web development environment, configured according to one embodiment of the present invention, automatically editing another code listing;

FIGS. 4B-1 and 4B-2 represent a combined block diagram illustrating a style generator, as part of the Web development environment, configured according to one embodiment of the present invention, automatically editing another code listing;

FIGS. 5B-1 and 5B-2 represent a combined block diagram illustrating a style generator, as part of the Web development environment, configured according to one embodiment of the present invention, automatically editing another code listing;

FIGS. 6B-1 and 6B-2 represent a combined block diagram illustrating the style generator, as part of the Web development environment, configured according to one embodiment of the present invention, automatically editing a code listing;

FIGS. 7B-1 and 7B-2 represent a combined block diagram illustrating the style generator, as part of the Web development environment, configured according to one embodiment of the present invention, automatically editing a code listing;

FIGS. 8B-1 and 8B-2 represent a combined block diagram illustrating the style generator, as part of the Web development environment, configured according to one embodiment of the present invention, automatically editing a code listing;

FIG. 9 is a block diagram illustrating a Web development environment configured according to one embodiment of the present invention;

FIG. 10 is a flowchart setting out example steps executed in implementing one embodiment of the present invention;

FIG. 11 illustrates a computer system adapted to use embodiments of the present invention; and FIGS. 12A and 12B are a combined flowchart illustrating example steps used to implement an additional embodiment of the present invention.

DETAILED DESCRIPTION OF THE INVENTION

Figure 1:
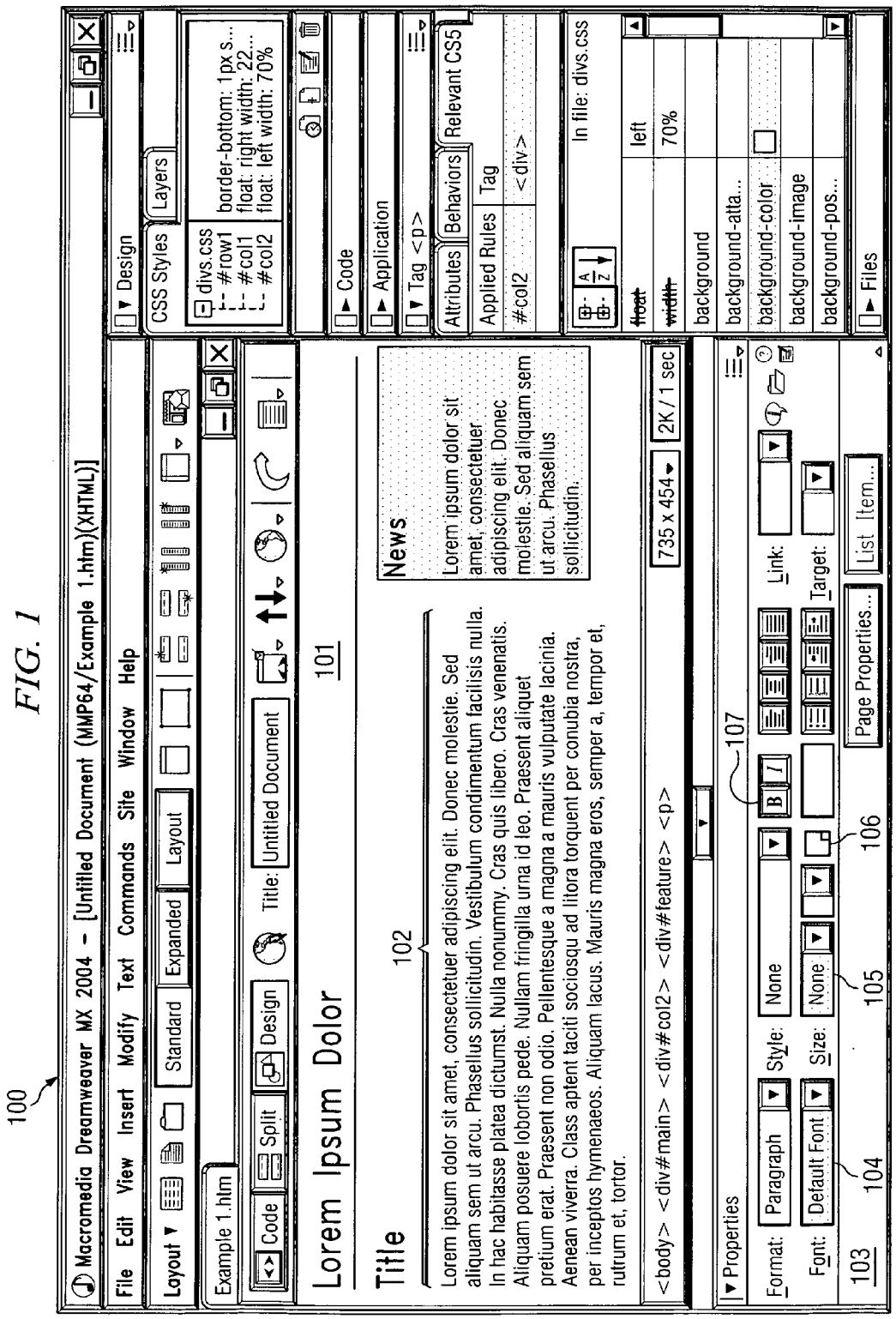
FIG. 1 is a screen shot illustrating a Web page being edited in a Web development environment configured according to one embodiment of the present invention.

FIG. 1 is a screen shot illustrating Web page 101 being edited in Web development environment 100 configured according to one embodiment of the present invention. Web page 101 displays text content 102 in the graphical design view mode of Web development environment 100. The graphical design view mode allows developers to perform edits to Web page 101 by performing graphical actions on the rendered page. These graphical actions cause Web development environment 100 to automatically edit the underlying HTML.

Web development environment 100 displays property inspector 103, which is an interface element that allows developers to manipulate the attributes of various elements and content of Web page 101. Property inspector 103 is similar to a toolbar, which users may be familiar with in text editors or word processor applications. Property inspector 103 includes font interface 104, font type size interface 105, font color swatch 106, bold indicator 107, and the like, that provide interface points for a developer to define or change the individual properties or appearances of the Web content. Web development environment 100 includes technology similar to that used in Web browsers that enables the design view editing mode to display Web page 100 to the developer as it would be displayed in a typical Web browser.

Figure 2A:
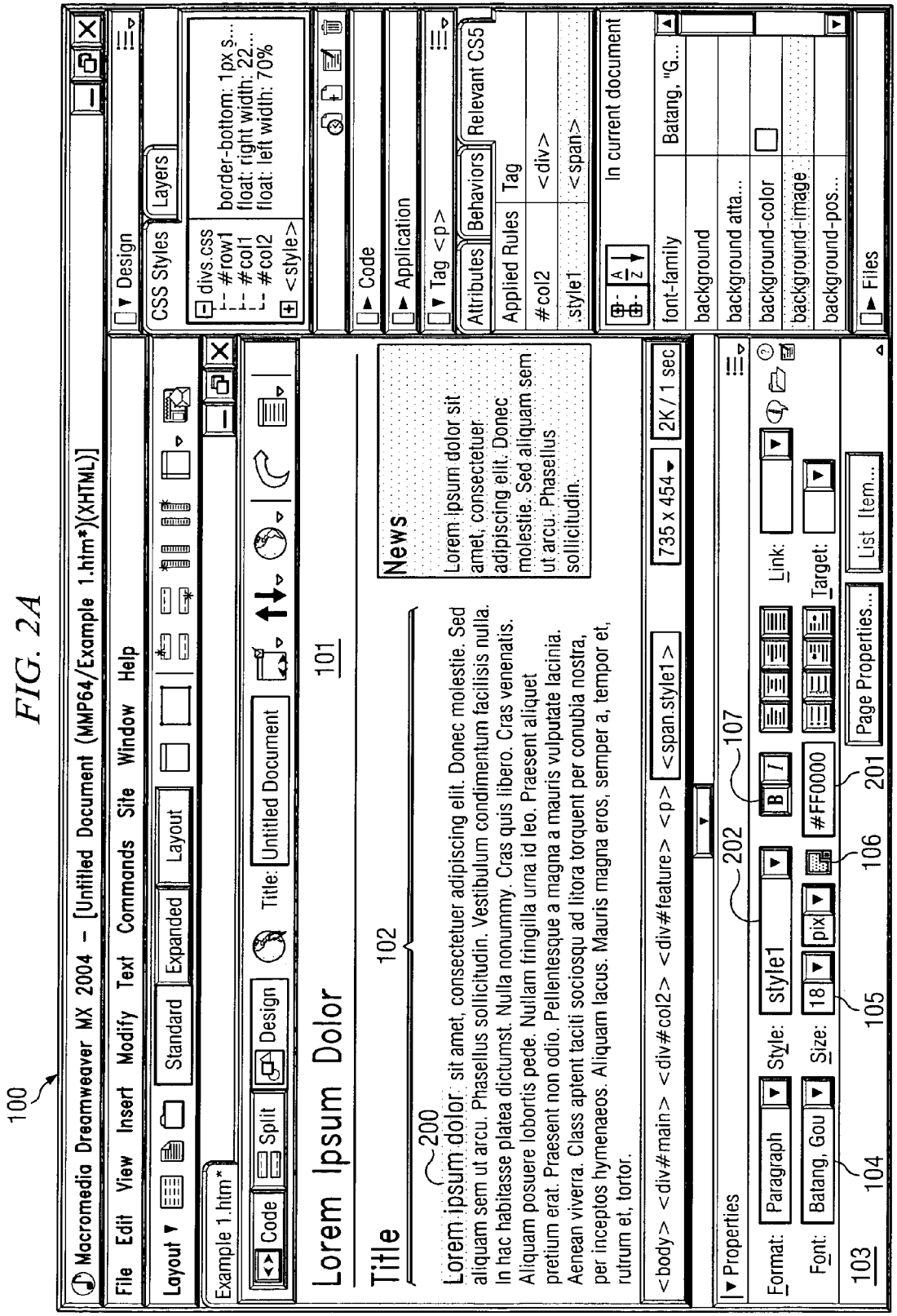
FIG. 2A is a screen shot illustrating the Web page edited within a Web development environment configured according to one embodiment of the present invention.

FIG. 2A is a screen shot illustrating Web page 101 edited within Web development environment 100 configured according to one embodiment of the present invention. In editing Web page 101, the developer highlights content selection 200 in order to manipulate the content within highlighted content selection 200 of text content 102 by using the tools in property inspector 103. For example, if the developer desired to change the appearance of highlighted content selection 200, the developer may change the text font shown in font type interface 104 by selecting a new font. The developer may also select a new font size in font size interface 105 and set a font color in either color swatch 106 or color interface 201. Web page 101 of FIG. 2A shows the text within highlighted content section 200 in a bold font. The developer may define this change by selecting bold indicator 107.

As the developer manipulates the tools within property inspector 103, the appearance of the text within highlighted content section 200 changes in appearance as well. However, unlike previous Web development environments, such as FRONTPAGE™, GO LIVE™, and the like, which merely place inline HTML stylistic tags around the underlying text code when a developer assigns inline stylistic formatting in a graphical design view editing mode, Web development environment 100, as configured according to one embodiment of the present invention, automatically generates style rules, such as CSS rules, having properties that correspond to the developer assigned inline stylistic formatting and places such rules within the underlying HTML code as a style or style sheet. However, there is no change in the development process for the Web developer. Property inspector 103 notifies the developer of such styles in style interface 202. One example of such Web development environment 100 configured according to one embodiment of the present invention is MACROMEDIA INC.'s DREAMWEAVER™ MX 2004.

FIGS. 2B-1 and 2B-2 represent a combined block diagram illustrating style generator 23, as part of Web development environment 100, configured according to one embodiment of the present invention, automatically editing code listing 21 into code listing 22. Code listing 21 includes paragraph tags 108 surrounding text content 102 within code listing 21 to define the structure of text content 102 as a paragraph. The various tags and elements in code listing 100 define how Web page 101 (FIG. 1) is displayed within a Web browser. As the developer makes the graphical edits using property inspector 103 (FIG. 2A), style generator 23, which is part of Web development environment 100, automatically generates the new styles and modifies code listing 21 to become code listing 22.

Code listing 22 includes content section 200, as selected by the user. When the developer graphically changes the visual attributes of content section 200, style generator 23 automatically generates style rule 203 that defines the font type, font size, font color, and boldness properties that were selected by the developer in property inspector 103 (FIG. 2A). Style generator 23 then places span tags 204 around highlighted content section 200 to assign style rule 203 to the selected content of text content 102. Span tags 204 are placed within paragraph tags 108 that define part of Web page 101 (FIG. 2A).

One of the concepts that makes style sheet formatting, such as CSS, more efficient is the concept of reuse. Style sheet rules that define a particular stylistic format or property may be reused against different portions of selected content. Even though the rule may only be defined once, such as in style rule 203, it is applied against multiple sections of a Web page or collection of Web pages, thus, reducing the size of the Web page and/or collection of Web pages.

Figure 3A:
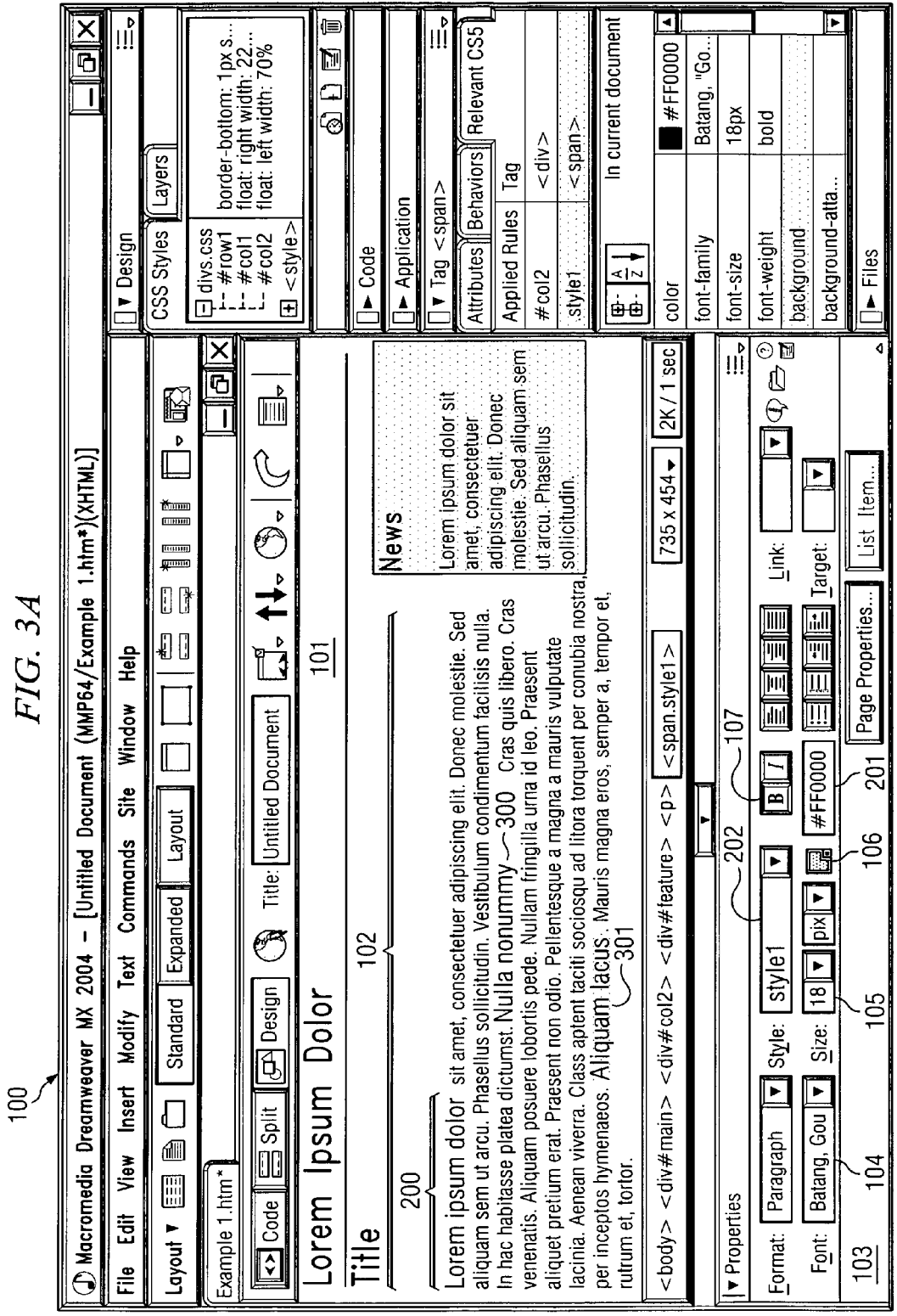
FIG. 3A is a screen shot illustrating the Web page being edited in the Web development environment configured according to one embodiment of the present invention and reusing existing style rules.

FIG. 3A is a screen shot illustrating Web page 101 being edited in Web development environment 100 configured according to one embodiment of the present invention and reusing existing style rules. During the editing process, the developer may edit additional portions of text content 102. For example, text 300 is shown in an edited format. As illustrated, the style of content section 200 is different from the style assigned to text 300. Moreover, the additional content selected by the developer in highlighted content 301 is edited by the developer by selecting various attributes in property inspector 103. Font interface 104, font size interface 105, color swatch 106, color interface 201, and bold indicator 107.

As the developer enters the selected changes with the tools of property inspector 103, Web development environment 100 captures the stylistic formatting changes and compares those changes to a collection of existing styles that Web development environment 100 maintains in an underlying data structure. If Web development environment 100 does not find a style that matches the collection of properties and/or stylistic formatting changes that are selected by the developer, a new style rule is automatically generated having those properties and applied to the selected content. However, if an existing style is found that matches the collection of properties and/or stylistic formatting changes, Web development environment 100 applies the matching style to the selected text.

In the example shown in FIG. 3A, the developer has selected the same stylistic attributes to apply to highlighted content 301 as were selected and applied to content selection 200. Web development environment 100 is, therefore, able to find a style match in style1, as shown in style interface 202. Thus, even though the developer has applied single, inline style changes to highlighted content 301 using the tools on property inspector 103, Web development environment 100 has applied an existing style sheet rule to the selected content.

FIGS. 3B-1 and 3B-2 represent a combined block diagram illustrating style generator 23, as part of Web development environment 100, configured according to one embodiment of the present invention, automatically editing code listing 31 into code listing 32. Code listing 31 illustrates the assignment of the various styles to the portions of text content 102 before the developer begins editing, as shown in FIG. 3A. Span tags 204 encompassing content selection 200 indicate that style rule 203 applies to its content. Similarly, responsive to additional editing of text content 102, span tags 302 encompassing text 300 indicate that style rule 304 applies to its content. As shown in code listing 31, highlighted content 301 remains in the original formatting of content 102.

As the developer selects the inline stylistic changes in property inspector 103 (FIG. 3A), style generator 23 compares those changes with the collection of exiting style rules, such as style rules 203 and 304. Because the formatting selected for highlighted content 301 matches the formatting or properties of style rule 203, style generator 23 automatically generates span tags 303 to assign style rule 203 to highlighted content 301, thus reusing existing style rules.

It should be noted that the various embodiments of the present invention are not limited to matching only existing styles that are located within the same Web document. In additional and/or alternative embodiments of the present invention, the Web development environment may search a data structure of all style rules, even style rules contained in external style sheets that are properly linked to the currently edited Web document.

Figure 4A:
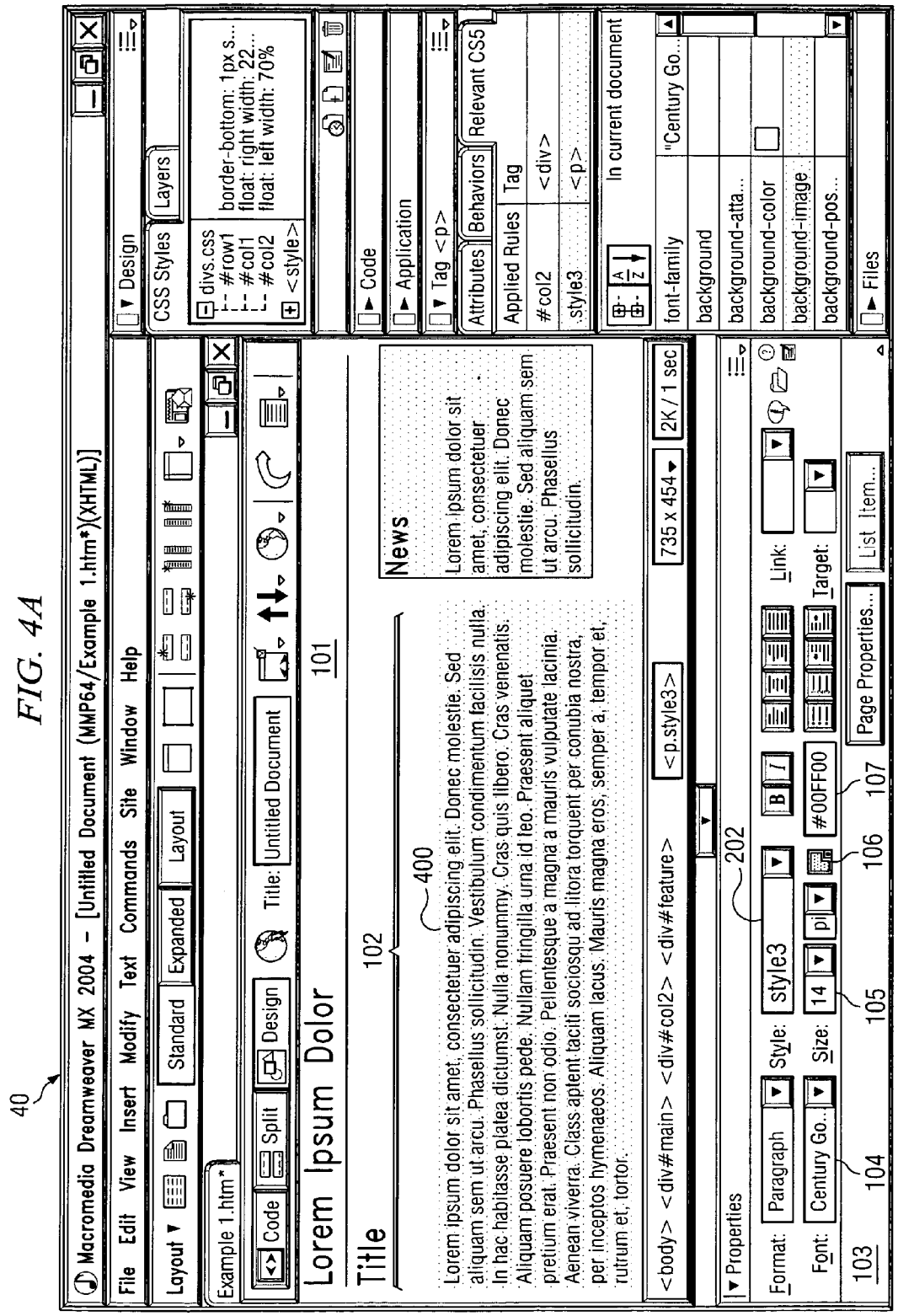
FIG. 4A is a screen shot illustrating the Web page 101 edited in a Web development environment configured according to an additional embodiment of the present invention.

FIG. 4A is a screen shot illustrating Web page 101 edited in Web development environment 40 configured according to an additional embodiment of the present invention. The embodiment of Web development environment 40 illustrated in FIG. 4A also determines whether or not the stylistic changes are added to the entirety of a structural element of Web page 101 and, instead of adding additional span tags, modifies the existing structural tags to include class designators for assigning the particular style or style rule to the entire structural element. For example, style3, shown in style interface 202 is applied to highlighted content section 400, which encompasses or highlights the entirety of text content 102. Style3 includes the properties or stylistic formatting implemented through property inspector 103, including selections in font type interface 104, font size 105, color swatch 106, and color interface 107.

FIGS. 4B-1 and 4B-2 represent a combined block diagram illustrating style generator 43, as part of Web development environment 40, configured according to one embodiment of the present invention, automatically editing code listing 21 into code listing 41. Code listing 21 includes paragraph tags 108 surrounding text content 102 within code listing 21 to define the structure of text content 102 as a paragraph. The various tags and elements in code listing 100 define how Web page 101 (FIG. 1) is displayed within a Web browser. As the developer makes the graphical edits using property inspector 103 (FIG. 4A), style generator 43, which is part of Web development environment 40, automatically generates the new style and changes code listing 21 into code listing 41.

As the developer makes the stylistic changes to Web page 101 comprising style3, style generator 43 automatically generates style rule 402 and modifies paragraph tag 108 by adding class identifier 401 that assigns style rule 402 to the paragraph element of text content 102. Therefore, instead of adding an addition span tag to complicate and/or clutter the code structure of code listing 41, style generator 43, configured according to the embodiment of the present invention illustrated in FIG. 4A, modifies the existing code structure of code listing 41 to assign style rule 402.

Figure 5A:
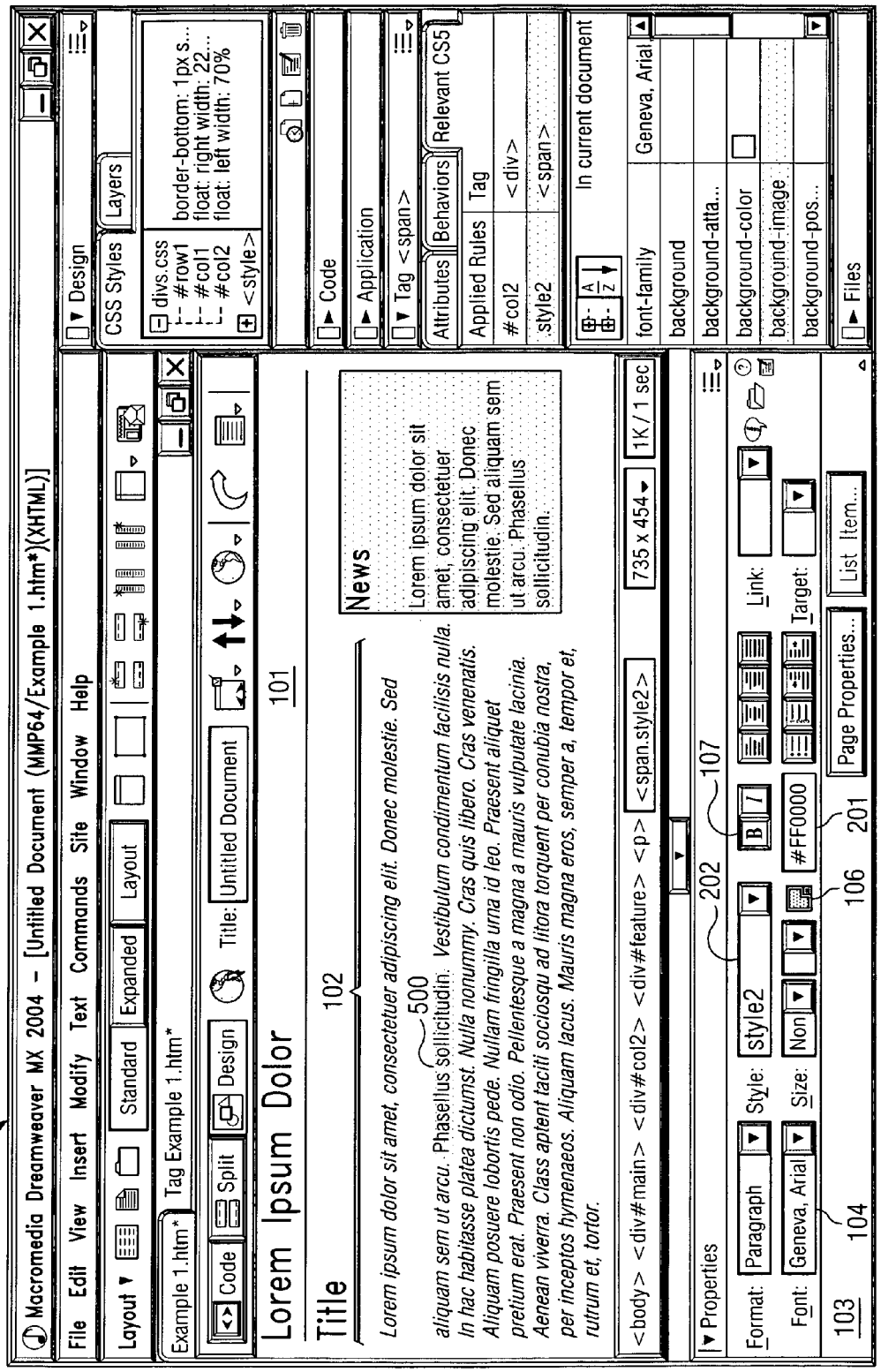
FIG. 5A is a screen shot illustrating the Web page edited in a Web development environment configured according to an additional embodiment of the present invention.

FIG. 5A is a screen shot illustrating Web page 101 edited in Web development environment 50 configured according to an additional embodiment of the present invention. Web page 101 is shown displaying text content 102 in italic formatting. The developer has selected a portion of text content 102, highlighted content 500, to edit using the tools of property inspector 103, including font type interface 104, color swatch 106, color interface 201, and bold indicator 107. The newly created style, style2, shown in style interface 202, which style generator 53 of Web development environment 50 automatically created using the individual stylistic changes made by the developer, is applied to highlighted content 500.

FIGS. 5B-1 and 5B-2 represent a combined block diagram illustrating style generator 53, as part of Web development environment 50, configured according to one embodiment of the present invention, automatically editing code listing 51 into code listing 52. Code listing 51 defines a paragraph construct for text content 102 by spanning text content 102 with paragraph tags 108. HTML also allows stylistic formatting to be applied using HTML style tags. Italics tags 501 span text content 102 to define the regions within code listing 51 to be made italics when rendered in a Web browser. Prior to the advent of CSS and other such style sheet formatting, Web developers typically used this method to design Web pages.

As the developer makes stylistic changes using property inspector 103 (FIG. 5A), style generator 53, which is part of Web development environment 50, automatically generates style rule 505 to be applied to highlighted content 500. Style generator 53 modifies code listing 51 by inserting span tag 502 around highlighted content 500 to assign the generated style in code listing 52. However, the stylistic changes applied by the developer in property inspector 103 (FIG. 5A), which are then automatically coded in a style sheet rule, such as style rule 505, do not include the formatting defined by HTML italics tags 501.

In typical application of the currently described embodiment of the present invention, span tag 502 surrounds highlighted content 500 and uses a class identifier to assign style rule 505. Application of style rule 505 occurs between HTML italics tags 501. However, style rule 505 does not include the stylistic formatting defined by HTML italics tags 501. HTML generally applies its formatting to the content that is encompassed by the stylistic tags. Therefore, placing a span tag between a valid set of HTML tags would cause the Web page, such as Web page 101, to render highlighted content 500 with italics, as defined in HTML italics tags 501, even though style rule 505 does not include an italics style rule element. The resulting rendered Web page would be incorrect.

In order to overcome this problem, which may result if Web development environment 50 (FIG. 5A) were to simply insert span tag 502 between italics tags 501, the additional embodiment of the present invention modifies code listing 51 by inserting italics tags 503 and 504 outside of span tags 502 in code listing 52. The instance of italics tag 503 located before span tags 502 closes the first original instance of italics tag 501, thereby creating a valid HTML italics section before highlighted content 500. The later instance of italics tag 504 opens the second original instance of italics tag 501, thereby creating another valid HTML italics section after highlighted content 500. Therefore, implementation of the additional embodiment of the present invention maintains the valid formatting of the original, unmodified content by modifying the existing HTML code structure to accommodate addition of the automatically generated style rules, such as style rule 505.

It should be noted that the example detailed in FIGS. 5A and 5B-1 and 5B-2 is not limited solely to situations in which an HTML stylistic tag-set is to be broken by an unrelated style assignment. For example, if the application of style rule 505 to highlighted content 500 occurred between span tags that assigned a different style rule, additional closing and opening span tags would be inserted in order to preserve the formatting of the portions of content both before and after highlighted content 500, yet allow this formatting to be turned off for highlighted content 500.

Figure 6A:
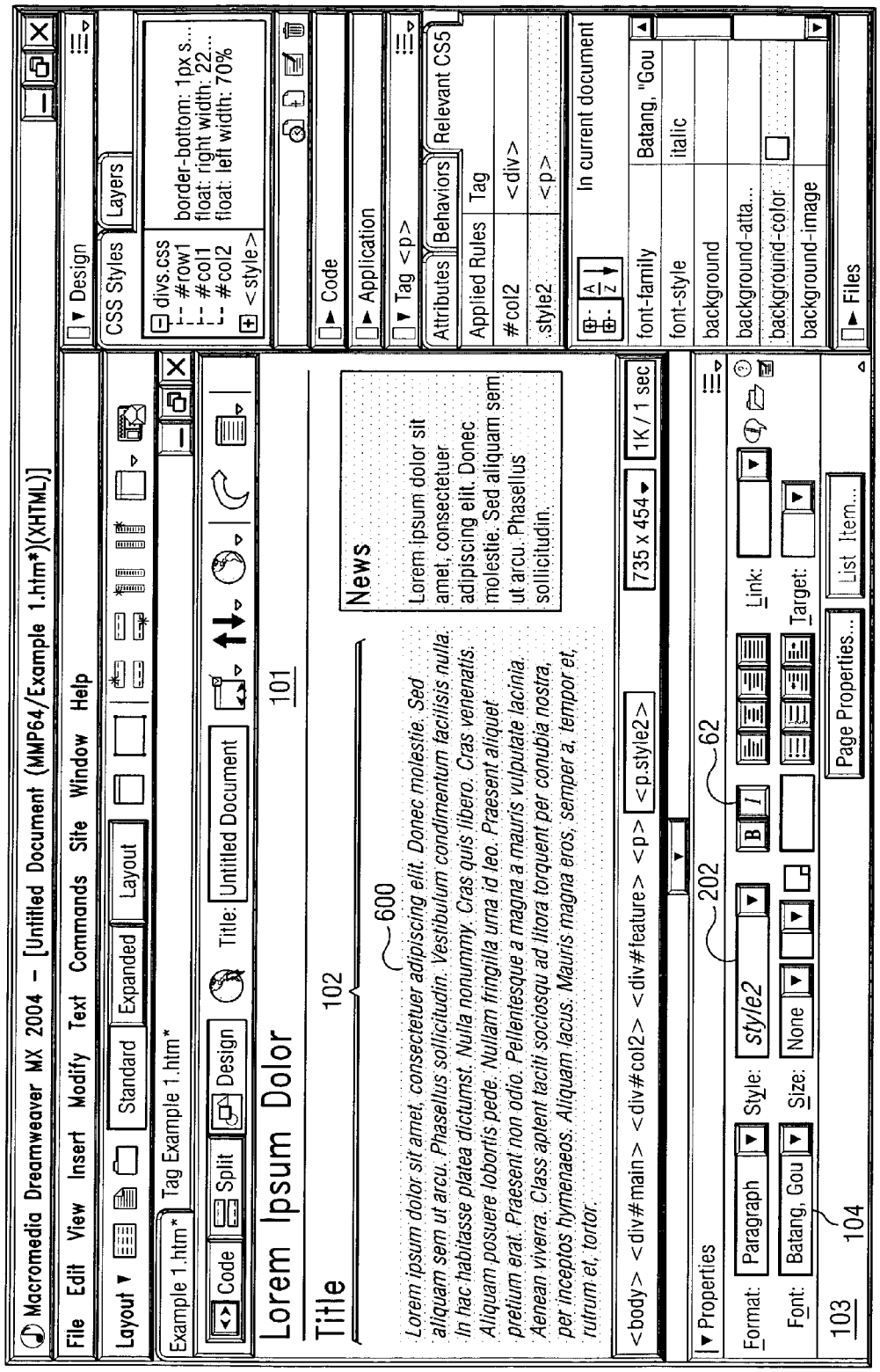
FIG. 6A is a screen shot illustrating the Web page 101 edited in the Web development environment configured according to another embodiment of the present invention.

FIG. 6A is a screen shot illustrating Web page 101 edited in Web development environment 50 configured according to another embodiment of the present invention. Text content 102 is displayed in italics having a non-default font style, as illustrated in font type interface 104 of property inspector 103. In the example illustrated, prior to the developer changing font types, text content 102 comprised only the display formatting of italics, as shown in italics indicator 62. The developer highlights text content 102 in highlighted content area 600 to make the changes to the font type. As the developer made changes to the font type, Web development environment 50 automatically creates a style rule for the newly created font type.

FIGS. 6B-1 and 6B-2 represent a combined block diagram illustrating style generator 53, as part of Web development environment 50, configured according to one embodiment of the present invention, automatically editing code listing 51 into code listing 61. Prior to editing Web page 101 in Web development environment 50, Web page 101 was defined using code listing 51. HTML italics tags 501 were used in code listing 51 to define the italics characteristics of text content 102. As the developer begins editing Web page 101, as shown in FIG. 6A, Web development environment 50 determines that the developer is applying stylistic changes to an entire HTML structure defined by paragraph tag 108. Therefore, instead of inserting a span tag around the content to be modified, style generator 53, as part of Web development environment 50, automatically generates style rule 602 containing the properties or stylistic changes entered by the developer and adds class identifier 601 to exiting paragraph tags 108 to assign style rule 602.

In addition to creating style rule 602 with the developer-selected changes, style generator 53 determines that HTML italics tags 501 are stylistic tags and not structural tags. Style generator 53 thereafter deletes HTML tags 501 and adds italics rule 603 to style rule 602. Therefore, Web development environment 50, through style generator 53, is capable of enhancing and/or modernizing existing HTML code by automatically creating style rules, such as CSS rules, and incorporating the existing and/or deprecated inline style tags used with older HTML pages. Thus, the various embodiments of the present invention may be used to modernize an existing, older HTML Web page may by converting it from a stylistic tag-based document to a style sheet-based document.

Figure 7A:
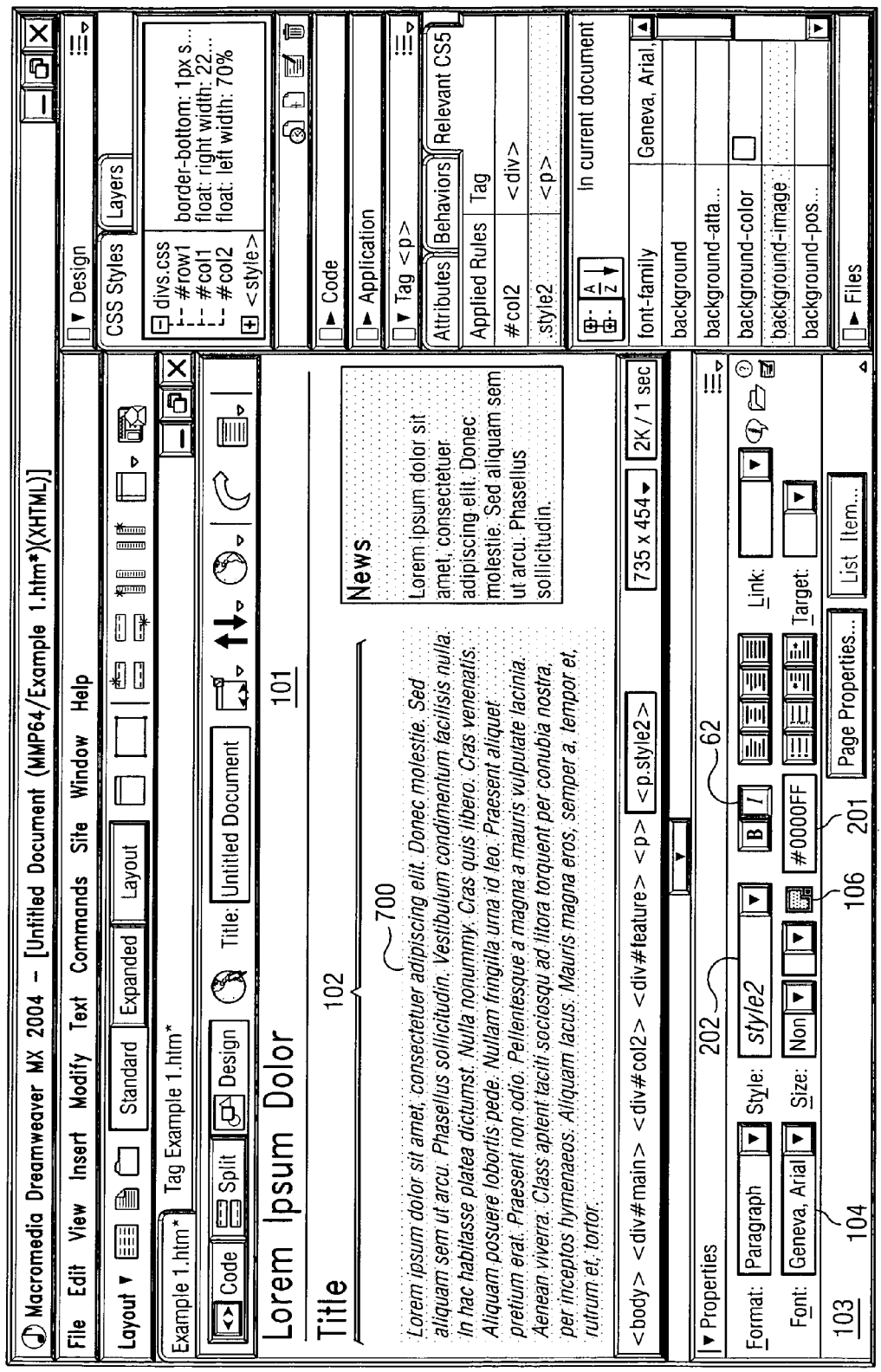
FIG. 7A is a screen shot illustrating the Web page edited in Web the development environment configured according to an additional embodiment of the present invention.

FIG. 7A is a screen shot illustrating Web page 101 edited in Web development environment 50 configured according to an additional embodiment of the present invention. Text content 102 is shown displayed in italics. It is also shown having a non-default font style, as illustrated in font style interface 104 of property inspector 103. In the example illustrated, prior to the developer changing font types, text content 102 comprised only the display formatting of italics, as shown in italics indicator 62. The developer highlighted text content 102 in highlighted content area 700 to make the changes to the font type. While the developer made changes to the font type, however, the style name remains style2. Web development environment 50, configured according to one embodiment of the present invention, determines whether the entire style rule is changing with the developer-selected stylistic changes or properties and, if so, modifies the properties of the automatically-generated style rule instead of creating an entirely new style rule.

FIGS. 7B-1 and 7B-2 represent a combined block diagram illustrating style generator 53, as part of Web development environment 50, configured according to one embodiment of the present invention, automatically editing code listing 70 into code listing 71. Before the developer begins making edits to Web page 101 in property inspector 103 (FIG. 7A), style rule 701 defines displaying the content that it is applied to in italics and in a particular color in code listing 70. Style rule 701 is applied to text content 102 in code listing 70 using class identifier 702 added to paragraph tags 108. When the developer selects highlighted content area 700 (FIG. 7A) and changes the font attributes, style generator 53 determines that the developer has changed the entire application of style rule 701. This determination would be made if style rule 701 were not applied to any other regions of content within Web page 101. Because style rule 701 has only been applied to text content 102 of Web page 101, in the illustrated example, when the developer makes changes to the font type, style generator 53 determines that style rule 701 has been changed in all applications of style rule 701 and automatically adds new font-family definition 703 to style rule 701 in code listing 71. Therefore, Web development environment 50, through operation of style generator 53, is able to modify its own automatically created style rules when such style sheets or style properties or formatting are changed by the developer.

Figure 8A:
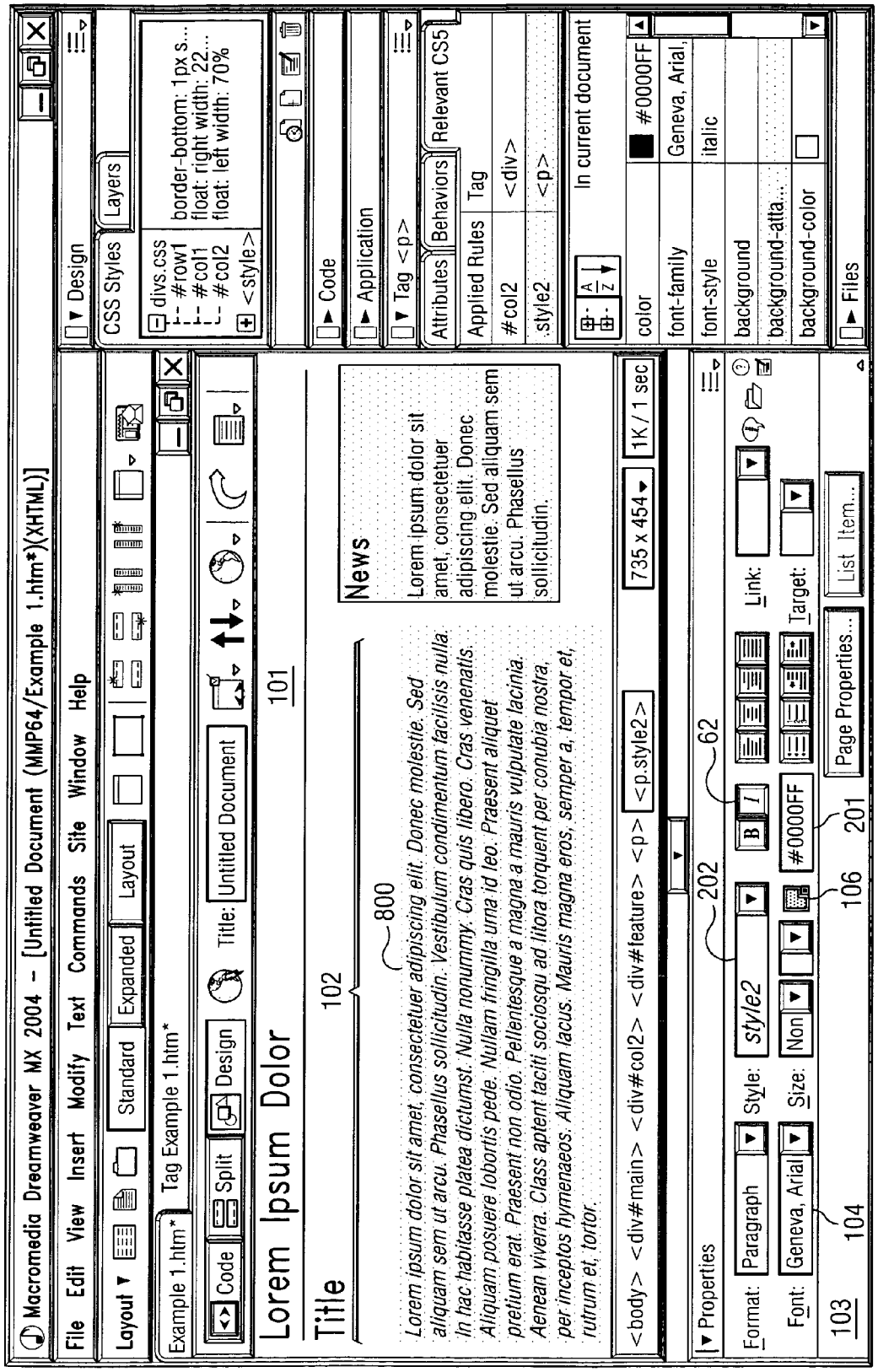
FIG. 8A is a screen shot illustrating the Web page edited in Web the development environment configured according to one embodiment of the present invention.

FIG. 8A is a screen shot illustrating Web page 101 edited in Web development environment 50. The developer edits Web page 101 by selecting all of text content 102 in highlighted content area 800 and selecting italic indicator 62. Prior to this editing, text content 102 was formatted with a style rule named BlueGeneva by the user. Unlike automatically named style rules, the embodiment of Web development environment 50 is configured not to modify standard or user-named style rules when a developer modifies all instances of the content to which the rule has been applied. Instead, Web development environment 50 automatically creates a new style using the existing style, BlueGeneva, as a base. This procedure ensures that user-created or even standard style sheets or style rules remain as originally defined.

FIGS. 8B-1 and 8B-2 represent a combined block diagram illustrating style generator 53, as part of Web development environment 50, configured according to one embodiment of the present invention, automatically editing code listing 80 into code listing 81. Style rule 801 was renamed BlueGeneva 82 by the user. Style rule 801, named BlueGeneva 82, modifies text content 102 in code listing 80. When the developer renames style rule 801, style generator 53 recognizes that all instances of the previous style needed to be changed to reflect the name change to BlueGeneva 82. Therefore, style generator 53 changes class identifier 802 to reflect the name change of style rule 801. The developer would be able to rename such styles either by entering the change directly into code listing 80 or by entering a name in style interface 202 of property inspector 103 (FIG. 8A).

By modifying the stylistic properties of highlighted content area 800 (FIG. 8A), style generator 53 automatically creates new style rule 803 comprising style sheet formatting 804 and adding italics property 805 selected by the developer because style generator 53 is configured to not edit or change a user-named or standard style. Style generator 53 then changes class identifier 802 attached to paragraph tags 108 in order to reflect the changed application of new style 803. Style rule 801 remains available for the developer to pick and apply to further content of Web page 101 should the developer desire to reuse similar formatting for additional content.

As referenced above, various embodiments of the present invention allow a developer or user to rename styles that may be automatically created by the Web development environments configured according to these embodiments. Therefore, developers may create multiple, new named styles that may be reused for additional content in the same Web page or even become part of an external style sheet that may be applied to any number of different Web pages.

It should be noted that the examples of Web pages and underlying code listings provided herein are intended only to represent examples of implementing and operating various embodiments of the present invention. These specific examples are not intended to limit the scope of the claimed invention to any particular Web page, underlying code structure, or the like. The various embodiments of the present invention may be included in many different Web development environments and may be used in the design, creation, and modification of any type of Web pages and/or Web sites.

FIG. 9 is a block diagram illustrating Web development environment 900 configured according to one embodiment of the present invention. Automatic style application 901 of Web development environment 900 monitors graphical user interface (GUI) 902 for editing selections or changes entered by a Web developer. Web development environment 900 uses GUI 902 to display an editable Web page document to the developer in a design view mode, which allows the developer to graphically edit the Web page. GUI 902 includes technology similar to that used in Web browsers that is capable of rendering Web content, such as HTML documents, or the like, contained in Web document 903.

When the developer makes stylistic changes to the Web page using the graphical editing tools provided in GUI 902, automatic style application 901 captures those changes and compares them to any existing styles or style rules administered in style data structure 906. Style data structure 906 is a data structure that keeps track of the existing styles available to the Web page and which Web page elements the styles are applied to. If automatic style application 901 does not find a matching style in style data structure 906, a new style is automatically generated by style rule generator 907 that defines each of the stylistic changes entered by the developer. Style rule generator 907 may be implemented as a set of rules for translating or mapping HTML markup into CSS.

Automatic style application 901 adds the new style to style definition section 905 of Web document 903, and then adds style assignments to the selected content in code section 904. Once the new style is assigned to the desired content in code section 904, Web document 903 has been edited with style sheet formatting even though the developer has been graphically editing the Web page using inline style changes.

In alternative embodiments of Web development environment 900, automatic style application 901 may add the newly created styles to external style sheet 908. External style sheet 908 is a document that is separate from Web document 903, but that is linked to Web document 903 in order to provide the style definitions used in Web document 903. By using external style sheet 908, the automatically generated styles may not only be used in the current Web page being edited in GUI 902, but also in other Web pages defined by Web documents 909-1-909-N, which may also be linked to external style sheet 908.

FIG. 10 is a flowchart setting out example steps executed in implementing one embodiment of the present invention. In step 1000, style changes detected from a Web developer are captured. Those changes are then compared against any existing styles in step 1001. If there are no matching styles that already exist, a new style is generated, in step 1002, that incorporates all of the style changes made by the developer. This new style is then applied, in step 1003, to the content selected for change by the developer. If an existing style does exist, the existing style is applied, in step 1004, to the content changed by the developer.

The program or code segments making up the various embodiments of the present invention can be stored in a computer readable medium or transmitted by a computer data signal embodied in a carrier wave, or a signal modulated by a carrier, over a transmission medium. The "computer readable medium" may include any medium that can store or transfer information. Examples of the computer readable medium include an electronic circuit, a semiconductor memory device, a ROM, a flash memory, an erasable ROM (EROM), a floppy diskette, a compact disk CD-ROM, an optical disk, a hard disk, a fiber optic medium, a radio frequency (RF) link, and the like. The computer data signal may include any signal that can propagate over a transmission medium such as electronic network channels, optical fibers, air, electromagnetic, RF links, and the like. The code segments may be downloaded via computer networks such as the Internet, Intranet, and the like.

FIG. 11 illustrates computer system 1100 adapted to use embodiments of the present invention, e.g. storing and/or executing software associated with the embodiments. Central processing unit (CPU) 1101 is coupled to system bus 1102. The CPU 1101 may be any general purpose CPU. However, embodiments of the present invention are not restricted by the architecture of CPU 1101 as long as CPU 1101 supports the inventive operations as described herein. Bus 1102 is coupled to random access memory (RAM) 1103, which may be SRAM, DRAM, or SDRAM. ROM 1104 is also coupled to bus 1102, which may be PROM, EPROM, or EEPROM. RAM 1103 and ROM 1104 hold user and system data and programs as is well known in the art.

Bus 1102 is also coupled to input/output (I/O) controller card 1105, communications adapter card 1111, user interface card 1108, and display card 1109. The I/O adapter card 1105 connects storage devices 1106, such as one or more of a hard drive, a CD drive, a floppy disk drive, a tape drive, to computer system 1100. The I/O adapter 1105 is also connected to a printer (not shown), which would allow the system to print paper copies of information such as documents, photographs, articles, etcetera. Note that the printer may be a printer (e.g. dot matrix, laser, etcetera.), a fax machine, scanner, or a copier machine. Communications card 1111 is adapted to couple the computer system 1100 to a network 1112, which may be one or more of a telephone network, a local (LAN) and/or a wide-area (WAN) network, an Ethernet network, and/or the Internet network. User interface card 1108 couples user input devices, such as keyboard 1113, pointing device 1107, etcetera to the computer system 1100. The display card 1109 is driven by CPU 1101 to control the display on display device 1110.

Figure 12A:
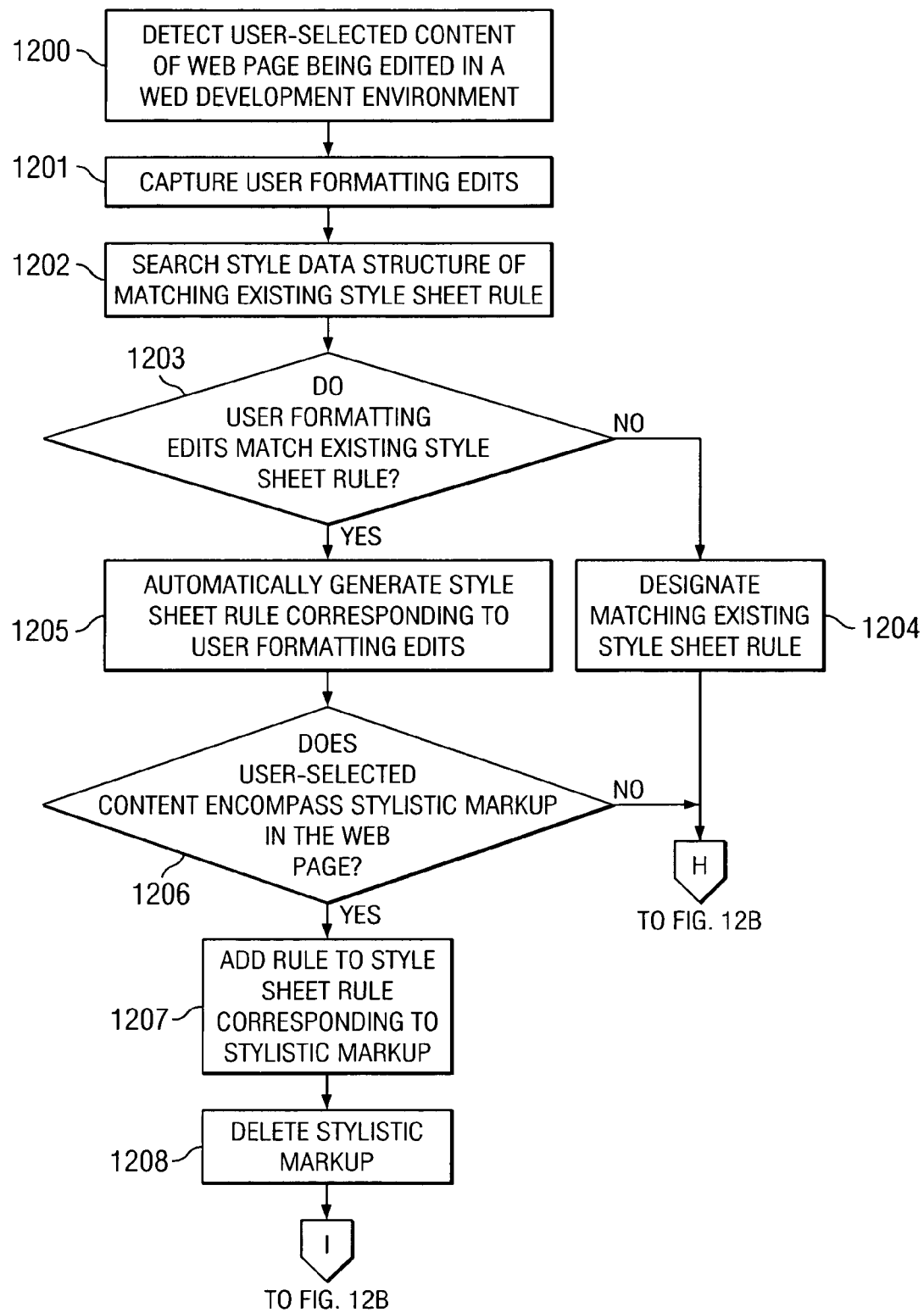

FIGS. 12A and 12B are a combined flowchart illustrating example steps used to implement an additional embodiment of the present invention. In step 1200, user-selected content of Web page being edited in a Web development environment is detected. User formatting edits are captured, in step 1201. In step 1202, a style data structure of matching existing style sheet rule is searched for matching style sheet rules. It is determined, in step 1203, whether the user formatting edits match existing style sheet rules. If there are no matches, a style sheet rule is automatically generated, in step 1204, corresponding to user formatting edits. If a match is found, the matching existing style sheet rule is designated in step 1205.

In step 1206, it is determined whether the user-selected content encompasses stylistic markup in the Web page. If so, properties or rules are added to the style sheet rule, in step 1207, corresponding to the stylistic markup, and the stylistic markup is then deleted in step 1208. After step 1208, the additional embodiment assigns the appropriated identified style sheet rule in step 1219. If, in response to the determination in step 1206, the user-selected content does not encompass stylistic markup, it is determined, in step 1210, whether the user-selected content encompasses a structural element of the Web page. If a structural element is encompassed, the markup tags for the structural element are modified, in step 1209, for assignment of the applicable style sheet rule. After step 1209, the additional embodiment assigns the appropriated identified style sheet rule in step 1219.

If a structural element is not identified in step 1210, then, in step 1211, it is determined whether the user-selected content is surrounded by stylistic markup. If stylistic markup surrounds the user-selected content, another determination is made, in step 1212, whether the user formatting edits to the user-selected content include the same formatting defined by the encompassing stylistic markup. If not, stylistic markup is inserted, in step 1213, to turn off the stylistic markup for the user-selectedcontent. If the user-selected content does include the same formatting, as determined by step 1212, no changes are made and the appropriate identified style sheet rule is assigned in step 1219.

Conversely, if there is no stylistic markup surrounding the user-selected content as determined in step 1211, it is determined in step 1214, whether the user-selected content comprises all applications of the style sheet rule. If so, a further determination is made, in step 1215, whether the existing style sheet rule is a user-named or standard style sheet rule. If, as determined in step 1215, the existing style sheet rule is not a user-named or standard style sheet rule, the existing style sheet rule is modified, in step 1216, to include the user formatting edits. If, as determined in step 1215, the existing style sheet rule is a user-named or standard style sheet rule, a new style sheet rule is automatically generated, in step 1217, using the matching existing style sheet rule and the user formatting edits. After establishing the appropriate style sheet rule to apply, it is assigned, in step 1219, to the user-selected content. If, as determined in step 1214, the user-selected content does not comprise all applications of the style sheet, a new style sheet rule is automatically generated, in step 1218, using the user formatting edits. This new style sheet rule would then be assigned in step 1219.

What is claimed is:

1. A method for automatically generating style sheet formatting in a web development environment, the method comprising:

detecting selection of content within a web page while the web page is edited in a web development environment;

responsive to input received by the web development environment, automatically capturing one or more stylistic changes to said selected content;

responsive to capturing the one or more stylistic changes, automatically accessing a style data structure, the style data structure defined in a style sheet included in the web page or in a separate style sheet file referenced by the web page, wherein the style data structure comprises a plurality of style sheet rules and wherein each rule is applicable to one or more elements in the web page to control an appearance of the one or more elements;

automatically searching the style data structure for a style sheet rule defining a style having attributes that match said one or more stylistic changes to said selected content; and if a style sheet rule in said style sheet data structure matching said one or more stylistic changes is discovered, automatically applying the discovered style sheet rule to said content by modifying markup defining a structural element of said web page corresponding to said content;

otherwise automatically generating one or more style sheet rules for each of said one or more stylistic changes associated with said selection and updating the style sheet to include the generated one or more style sheet rules; and automatically applying the one or more generated style sheet rules to said content by modifying markup defining a structural element of said web page corresponding to said content.

2. The method of claim 1 further comprising:
detecting a set of stylistic tags surrounding said user-selection, wherein said one or more stylistic changes does not represent formatting defined by said set of stylistic tags;
responsive to said detecting, adding a closing stylistic tag before an opening tag of a set of assignment tags associating one of said one or more style sheet rules and said style to said user-selection, wherein said closing stylistic tag pairs with an opening one of said set of stylistic tags; and
responsive to said detecting, adding an opening stylistic tag after a closing tag of said set of assignment tags, wherein said opening stylistic corresponds to said closing stylistic tag.

3. The method of claim 1, wherein the style sheet comprises a cascading style sheet.

4. A method for editing a page in a development environment, the method comprising:
automatically comparing one or more edits made to user-selected content with a list of existing styles to identify at least one style having attributes matching the edits, the styles defined in a style sheet comprising one or more style sheet rules, the style sheet included in a document comprising said user-selected content or in a separate style sheet file referenced by the document comprising said user-selected content, each rule applicable to one or more elements in the document to control an appearance of the one or more elements; and
if a matching style in said style sheet is located in said comparing step, automatically applying the discovered style sheet rule to said content by modifying markup defining a structural element of said web page corresponding to said content;
otherwise, automatically generating a new style comprising said edits and updating the style sheet to include said new style; and applying the generated new style, to the user-selected content,
wherein said applying steps comprise automatically inserting spanning tags in said document around said user-selected content, wherein said spanning tags identify one of said matching style or said new style.

5. The method of claim 4 wherein said applying step comprises:
modifying structural markup to identify application of one of said matching style and said new style, said modifying responsive to said user-selected content corresponding to an area defined by said structural markup.

6. The method of claim 4, wherein said generating said new style comprises:
adding a style property to said new style.

7. The method of claim 4, wherein the style sheet comprises a cascading style sheet.

8. A computer program product having a non-transitory computer readable medium embodying computer program logic, said computer program product comprising:
code for identifying selected content within a page edited in a development environment, the selected content corresponding to a structural element of the page;
code for automatically acquiring one or more formatting edits to said selected content;
code for automatically accessing a style sheet, the style sheet included in the page or in a style sheet page referenced by the page, the style sheet comprising one or more style sheet rules defining one or more styles applicable to one or more structural elements in the page to control an appearance of the one or more structural elements;
code for comparing said one or more formatting edits to one or more existing styles to identify at least one style having attributes matching the formatting edits;
code for, if a matching style in said style sheet is located in said comparing step, automatically applying the discovered style sheet rule to said content by modifying markup defining a structural element of said web page corresponding to said content;
code for, otherwise automatically updating the style sheet to include a new style sheet rule defining a style corresponding to said one or more formatting edits associated with said selected content; and automatically changing markup defining the corresponding structural element to apply said new style sheet rule to said selected content.

9. The computer-readable medium of claim 8, wherein the style sheet comprises a cascading style sheet.

10. The computer program product of claim 8 further comprising:
code for detecting a set of stylistic tags surrounding said user-selection, wherein said one or more stylistic changes does not represent formatting defined by said set of stylistic tags;
code for responsive to said detecting, adding a closing stylistic tag before an opening tag of a set of assignment tags associating one of said one or more style sheet rules and said style to said user-selection, wherein said closing stylistic tag pairs with an opening one of said set of stylistic tags; and
code for responsive to said detecting, adding an opening stylistic tag after a closing tag of said set of assignment tags, wherein said opening stylistic tag corresponds to said closing stylistic tag.

11. A computer-implemented method comprising:
receiving, by an application executed by a computing system, input identifying a stylistic change to an element in a document, the element defined by markup code;
responsive to the input, automatically accessing a style sheet included in the document or in a separate style sheet file referenced by the document, wherein the style sheet comprises a plurality of style sheet rules and wherein each rule is applicable to one or more elements in the document to control an appearance of the one or more elements;
automatically searching the style sheet for a style sheet rule defining a style having attributes that match said stylistic change;
if a style sheet rule in said style sheet matching said stylistic change is found, automatically applying the discovered style sheet rule to said content by modifying markup defining a structural element of said web page corresponding to said content;
otherwise, automatically generating one or more style sheet rules for the stylistic change and updating the style sheet to include the generated one or more style sheet rules; and automatically applying the generated style sheet rule to said element by changing the markup code defining the element to reference the style sheet rule.

12. The computer-implemented method set forth in claim 11, wherein the document comprises a web page.

13. The computer-readable medium of claim 11, wherein the style sheet comprises a cascading style sheet.

14. The method of claim 11 further comprising:
 detecting a set of stylistic tags surrounding said user-selection, wherein said one or more stylistic changes does not represent formatting defined by said set of stylistic tags;
 responsive to said detecting, adding a closing stylistic tag before an opening tag of a set of assignment tags associating one of said one or more style sheet rules and said style to said user-selection, wherein said closing stylistic tag pairs with an opening one of said set of stylistic tags; and
 responsive to said detecting, adding an opening stylistic tag after a closing tag of said set of assignment tags, wherein said opening stylistic tag corresponds to said closing stylistic tag.

15. A computing system comprising a processor with access to a non-transitory computer-readable medium embodying one or more program components that configure the computing system to:
 detect selection of content within a page while the page is edited in an application, the content defined by markup code;
 responsive to input received by the application, automatically capture one or more stylistic changes to said content;
 responsive to capturing, automatically access a style data structure, the style data structure defined in a style sheet included in the page or in a separate style sheet file referenced by the page, wherein the style data structure comprises a plurality of style sheet rules, wherein each rule is applicable to one or more elements in the page to control an appearance of the one or more elements, and wherein the style sheet rules are logically distinct from the markup code defining the content;
 automatically search the style data structure for a style sheet rule defining a style having attributes that match said one or more stylistic changes;
 if a style sheet rule matching said one or more stylistic changes is found, automatically apply the discovered style sheet rule to said content by modifying markup defining a structural element of said web page corresponding to said content;
 otherwise automatically generate one or more style sheet rules for one or more stylistic changes associated with said selection; update the style sheet to include the generated one or more style sheet rules; and automatically apply said generated style sheet rule to said content by changing the markup code defining the content.

16. The system set forth in claim 15, wherein the page comprises a web page.

17. The system of claim 15, wherein the style sheet comprises a cascading style sheet.

18. The system of claim 15 wherein the one or more program components are further configured to cause the computing system to:
 detect a set of stylistic tags surrounding said user-selection, wherein said one or more stylistic changes does not represent formatting defined by said set of stylistic tags;
 responsive to said detecting, add a closing stylistic tag before an opening tag of a set of assignment tags associating one of said one or more style sheet rules and said style to said user-selection, wherein said closing stylistic tag pairs with an opening one of said set of stylistic tags; and
 responsive to said detecting, add an opening stylistic tag after a closing tag of said set of assignment tags, wherein said opening stylistic tag corresponds to said closing stylistic tag.

* * * * *

UNITED STATES PATENT AND TRADEMARK OFFICE
CERTIFICATE OF CORRECTION

PATENT NO. : 8,181,104 B1
APPLICATION NO. : 10/930714
DATED : May 15, 2012
INVENTOR(S) : Russ Helfand et al.

Page 1 of 1

It is certified that error appears in the above-identified patent and that said Letters Patent is hereby corrected as shown below:

Column 13, Claim 2, Line 15:

Insert the word --tag-- after the words "said opening stylistic" as follows:

"said opening stylistic tag corresponds to said closing stylistic tag"

Signed and Sealed this
Twelfth Day of February, 2013

Teresa Stanek Rea
*Acting Director of the United States Patent and Trademark Office*